United States Patent
Motoyama et al.

[11] Patent Number: 5,432,656
[45] Date of Patent: Jul. 11, 1995

[54] LIBRARY APPARATUS HAVING RECORDING MEDIUM ENTRY AND EJECTION UNITS

[75] Inventors: Nobuhiko Motoyama; Kenichi Utsumi, both of Kawasaki, Japan

[73] Assignee: Fujitsu Limited, Kawasaki, Japan

[21] Appl. No.: 54,032

[22] Filed: Apr. 28, 1993

[30] Foreign Application Priority Data

May 1, 1992 [JP] Japan .................. 4-112544
May 15, 1992 [JP] Japan .................. 4-123458
Jan. 29, 1993 [JP] Japan .................. 5-013534

[51] Int. Cl.⁶ ............................................. G11B 15/18
[52] U.S. Cl. ......................................... 360/69; 360/71; 360/92; 360/98.04
[58] Field of Search ............... 360/69, 71, 92, 98.01, 360/98.04, 98.06; 414/280, 276

[56] References Cited

U.S. PATENT DOCUMENTS

| | | | |
|---|---|---|---|
| 3,938,190 | 2/1976 | Semmlow et al. | 360/69 X |
| 4,779,151 | 10/1988 | Lind et al. | 360/69 X |
| 4,928,245 | 5/1990 | Moy et al. | 360/71 X |
| 4,937,690 | 6/1990 | Yamashita et al. | 360/69 X |
| 5,182,687 | 1/1993 | Campbell et al. | 360/71 X |

FOREIGN PATENT DOCUMENTS

| | | |
|---|---|---|
| 63-269370 | 11/1988 | Japan . |
| 63-344858 | 2/1991 | Japan . |
| 63-235243 | 10/1991 | Japan . |
| 63-259451 | 11/1991 | Japan . |
| 63-260951 | 11/1991 | Japan . |
| 63-121547 | 12/1991 | Japan . |
| 64-146561 | 5/1992 | Japan . |
| 64-157657 | 5/1992 | Japan . |

*Primary Examiner*—Andrew L. Sniezek
*Attorney, Agent, or Firm*—Greer, Burns & Crain, Ltd.

[57] ABSTRACT

A magnetic tape library apparatus having a magnetic tape cartridge entry unit and an automatic cartridge ejection includes a cell unit having a plurality of cells each accommodating a magnetic tape cartridge, a magnetic tape drive unit for writing and reading data to and from any one of the magnetic tape cartridges, and an accessor for automatically switching magnetic tape cartridges between cell unit and magnetic tape drive unit. The magnetic tape cartridge entry unit of the library apparatus includes a stacker for stacking a plurality of magnetic tape cartridges entered externally, and a delivery mechanism for delivering to the accessor each cartridge separated from the stacked cartridges in the stacker. The automatic cartridge ejection unit receives the cartridge from the accessor and transports it to an appropriate position for delivery onto a tray.

10 Claims, 27 Drawing Sheets

FIG.I

ENTRY DIRECTION

ENTRY DIRECTION

ENTRY DIRECTION

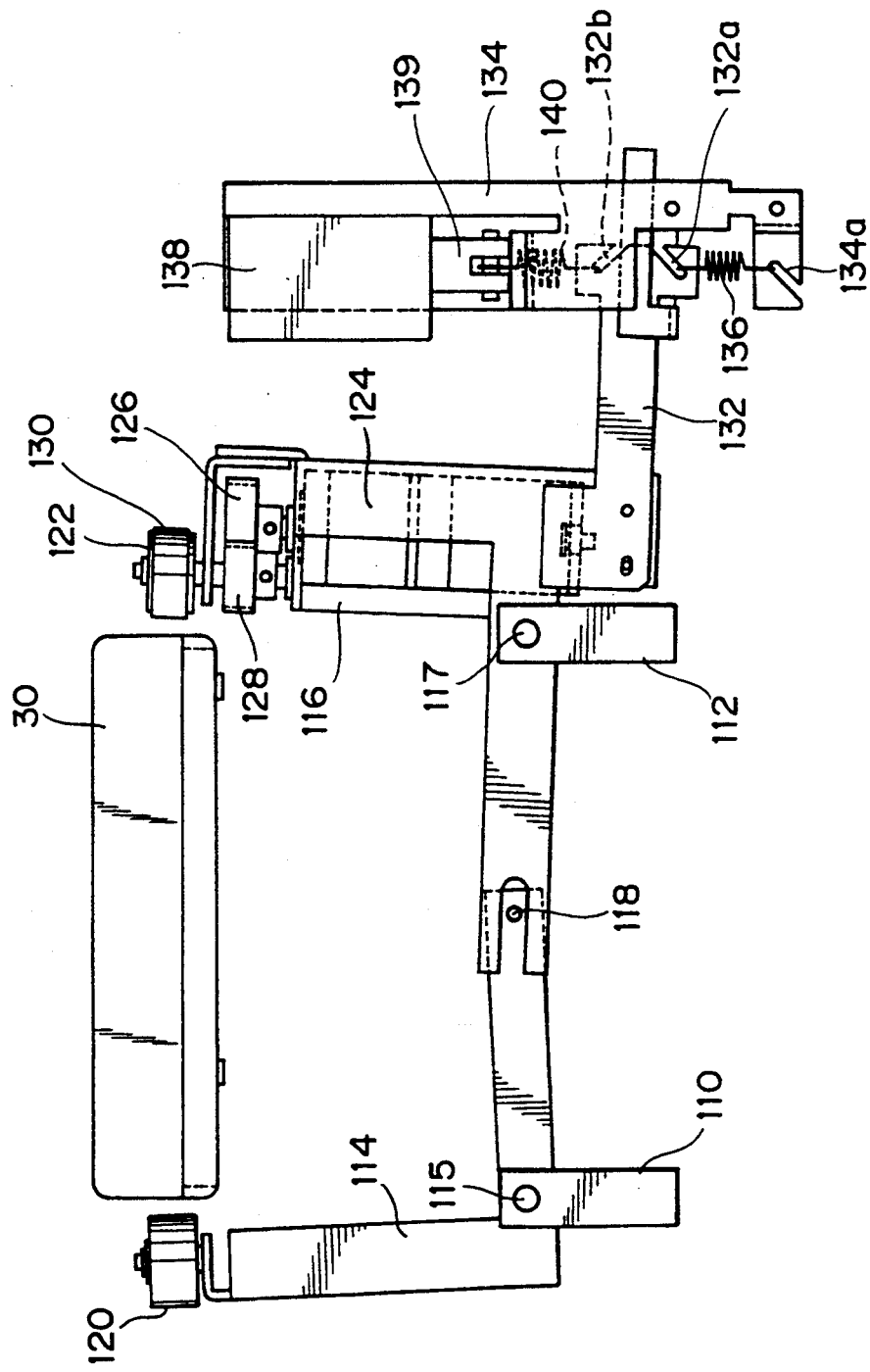

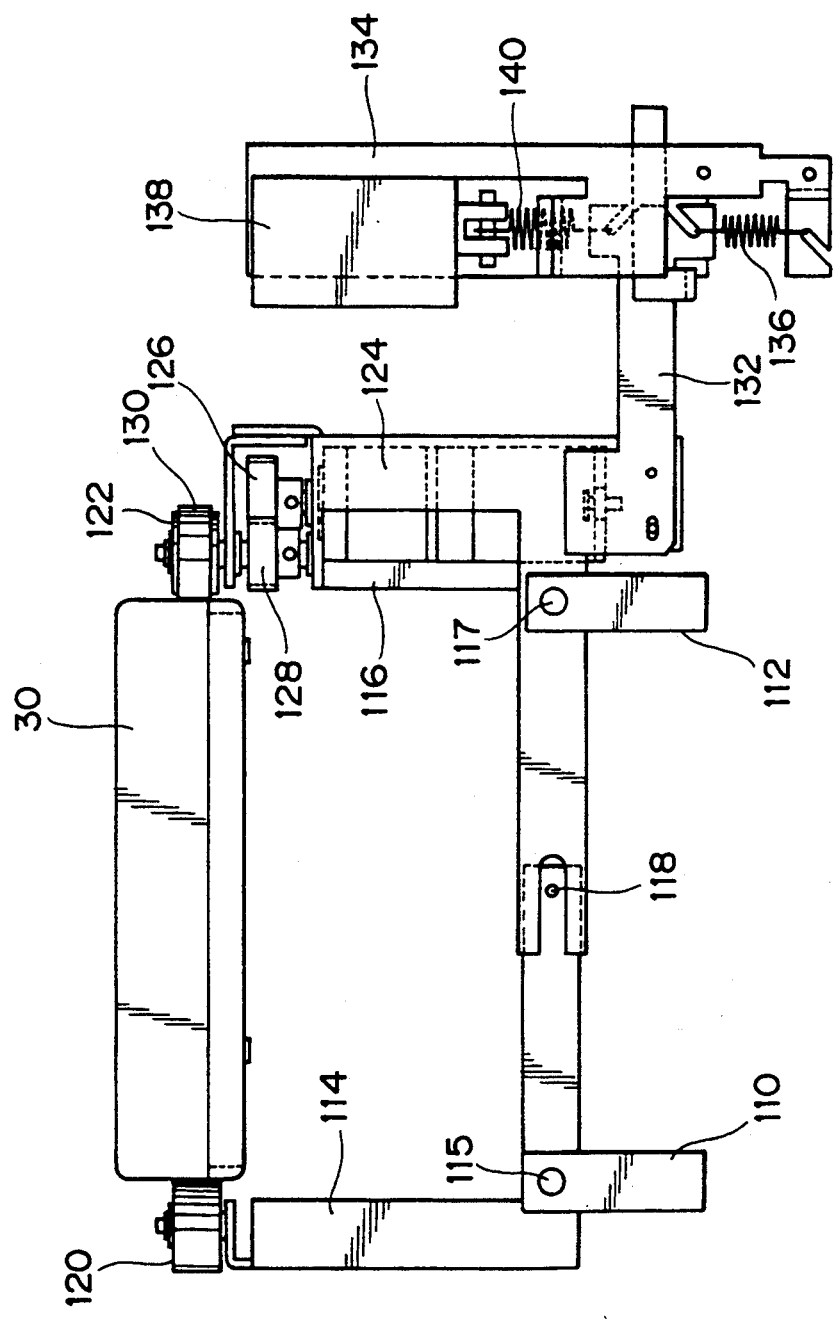

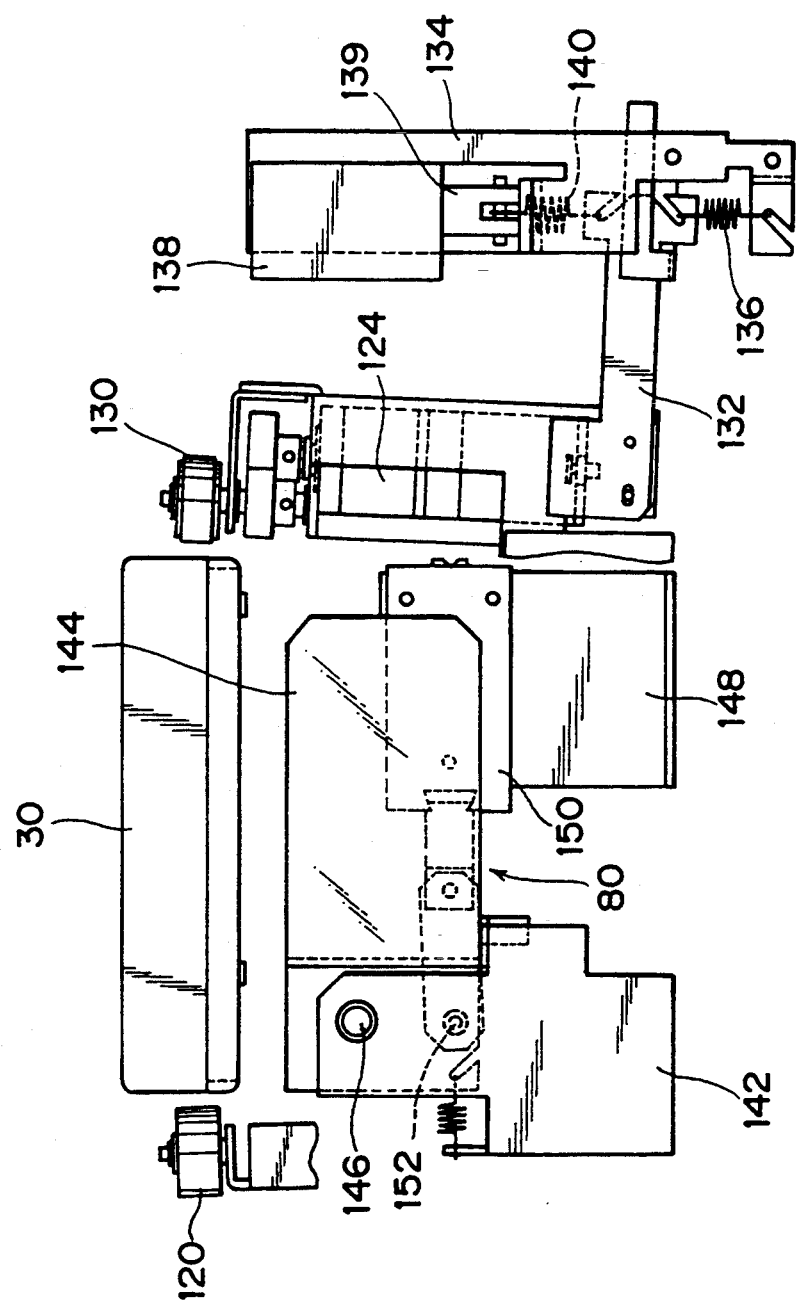

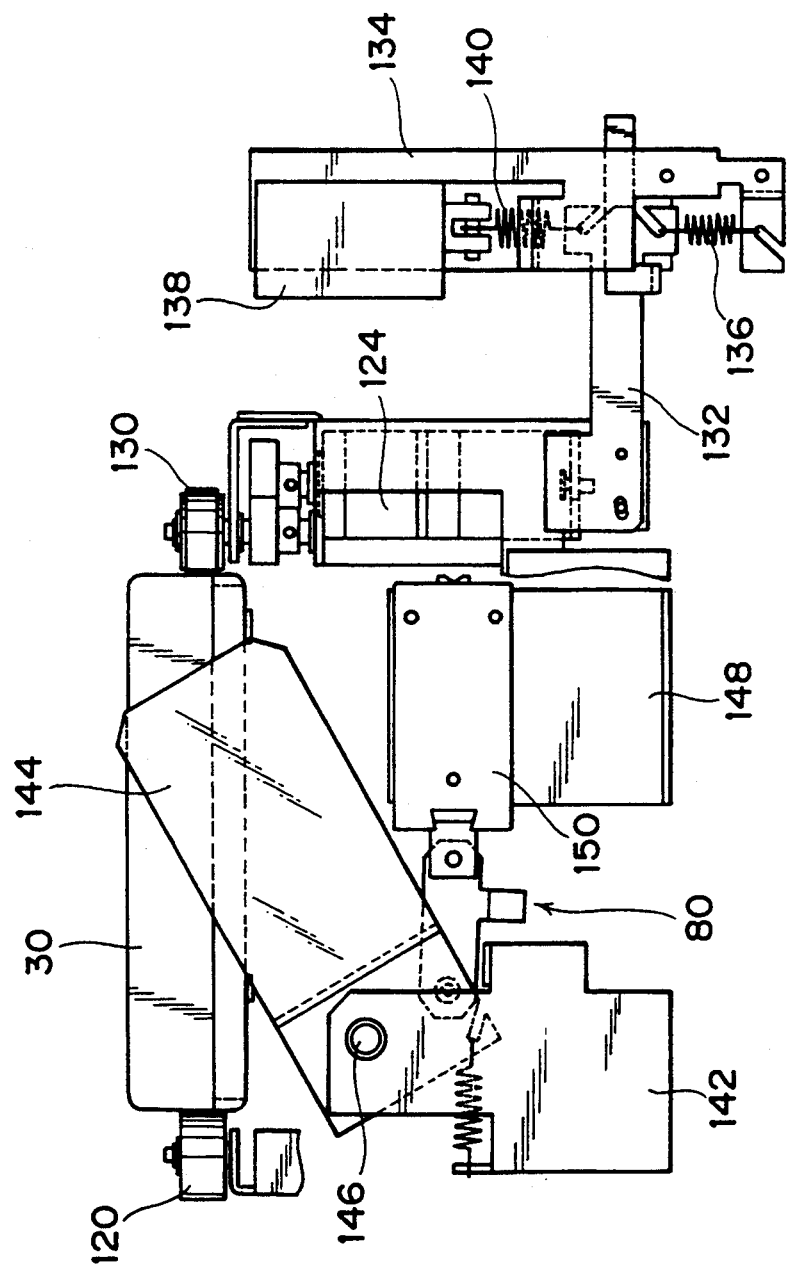

LIBRARY APPARATUS HAVING RECORDING MEDIUM ENTRY AND EJECTION UNITS

BACKGROUND OF THE INVENTION

1. Field of the Invention

The present invention relates generally to a recording medium library apparatus. More particularly, the invention relates to a magnetic tape library apparatus having magnetic tape cartridge entry and ejection units.

2. Description of the Related Art

Magnetic tape units are one of diverse kinds of external storage devices for use with computers. The magnetic tape units operate most commonly on what is known as the open reel System using 0.5-inch wide tapes. The chores of manually loading the open reels have been alleviated by widening acceptance of automatic tape loading devices. Today, operators' burdens are further alleviated by the widespread use of magnetic tape cartridges. A magnetic tape cartridge, accommodating a tape having the same width as that of open reel tapes, allows the tape to be threaded out of the reel within for automatic tape loading.

A plurality of magnetic tape cartridges needed are entered in the magnetic tape library apparatus. Any one of the cartridges is selected and loaded to a magnetic tape drive unit for data recording and reproduction. The magnetic tape library apparatus comprises a cell unit having a plurality of cells each accommodating a magnetic tape cartridge; a magnetic tape drive unit for recording and reproducing data; and an accessor for automatically switching magnetic tape cartridges between cell unit and magnetic tape drive unit. The magnetic tape library apparatus further comprises a cartridge entry unit for entering magnetic tape cartridge into the library apparatus and an automatic cartridge ejection unit for automatically ejecting magnetic tape cartridges from inside the library apparatus. Magnetic tape library apparatuses of this kind are widely used as an external mass storage device for computers. These apparatuses are required to operate unfailingly when unattended.

Cartridge entry units proposed so far have failed to give sufficient consideration to the relations between the disposition of the accessor and the structure of the cartridge entry unit. That is, each magnetic tape cartridge entered into the conventional cartridge entry unit is rotated 90 or 180 degrees by a rotation mechanism therein for delivery to the accessor. This necessitates a complicated structure of the cartridge entry unit, which in turn requires enlarging the library apparatus in scale. In addition, it takes time for the rotation mechanism to rotate the entered magnetic tape cartridge. That means more time required for cartridge entry processing.

The typical prior art automatic cartridge ejection unit comprises a pair of catch arms rotatably attached at one end thereof to shafts, a plurality of feed rollers attached rotatably to the catch arms, and a tray assembly for carrying the cartridge released by the catch arms. The tips of the catch arms have guide members that allow the catch arms to catch the cartridge horizontally. One disadvantage of this prior art structure is that cartridges cannot be transported stably inside the apparatus because it is difficult for the catch arms to grip each cartridge with a uniform force. Another disadvantage is that the catch mechanism tends to be large in scale because each catch arm is supported rotatably by its corresponding shaft.

SUMMARY OF THE INVENTION

It is therefore an object of the present invention to provide a library apparatus having a reliable recording medium cartridge entry unit of a simple construction.

It is another object of the invention to provide a library apparatus having an automatic recording medium ejection unit which is simple in construction and which ejects cartridges in a stable manner.

In accordance with an aspect of the present invention, there is provided a library apparatus comprising: a cell unit having a plurality of cells each accommodating a recording medium cartridge; a recording medium drive unit for writing and reading data to and from any one of the recording medium cartridges; an accessor for automatically switching recording medium cartridges between the cell unit and the recording medium drive unit; and a cartridge entry unit for entering recording medium cartridges into the library apparatus, the cartridge entry unit including: a stacker for stacking a plurality of recording medium cartridges; stage means for carrying the recording medium cartridges stacked in the stacker, the stage means being arranged to move up and down: hook means for separating the lowest-positioned cartridge from the recording medium cartridges placed on the stage means; and delivery means for delivering to the accessor the recording medium cartridge separated by the hook means, the delivery means being arranged to execute the delivery without altering the orientation of the separated recording medium cartridge as i was stacked in the stacker.

In a preferred structure according to the invention, the cartridge entry unit includes shutter means located in the position where the delivery means delivers the cartridge to the accessor, and a gate sensor for detecting a faulty entry of any cartridge placed onto the stacker. The cartridge entry unit according to the invention eliminates the need for a cartridge rotation mechanism because the unit delivers to the accessor the cartridge without altering its orientation in effect when the cartridge was placed in the stacker, In accordance with another aspect of the present invention, there is provided a library apparatus comprising: a cell unit having a plurality of cells each accommodating a recording medium cartridge; a recording medium drive unit for writing and reading data to and from any one of the recording medium cartridges; an accessor for automatically switching recording medium cartridges between the cell unit and the recording medium drive unit; and an automatic cartridge ejection unit for automatically ejecting recording medium cartridges from inside the library apparatus, the automatic cartridge ejection unit including: cartridge transport means for receiving the recording medium cartridge delivered by the accessor, transporting the delivered cartridge to a predetermined position and releasing the cartridge therein; and a tray assembly disposed under the cartridge transport means for carrying the recording medium cartridge released by the cartridge transport means, the tray assembly comprising a pair of side walls, a rear wall, a tray furnished in a vertically movable manner along the rear wall, and driving means for moving the tray vertically.

In another preferred structure according to the invention, the cartridge transport means comprises: a pair of L-shaped catch arms of which intermediate positions are pivotably mounted to a frame, one end of one catch arm being pivotably coupled to one end of the other catch arm; a plurality of feed rollers attached rotatably to the other end of each of the two catch arms; and driving means for opening and closing the catch arms. Because each ejected cartridge is caught by the two L-shaped catch arms of which the intermediate positions are pivotably mounted to a frame, the cartridge ejecting operation is carried out in a stable and unfailing manner.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIGS. 14A and 14B are schematic side views of a feeder mechanism in the cartridge entry unit, FIG. 14A showing the feeder being opened, FIG. 14B depicting the feeder being closed;

FIG. 15A and 15B are schematic side views of a shutter mechanism in the cartridge entry unit, FIG. 15A showing the shutter being opened, FIG. 15B portraying the shutter being closed;

DESCRIPTION OF THE PREFERRED EMBODIMENTS

Figure 1:
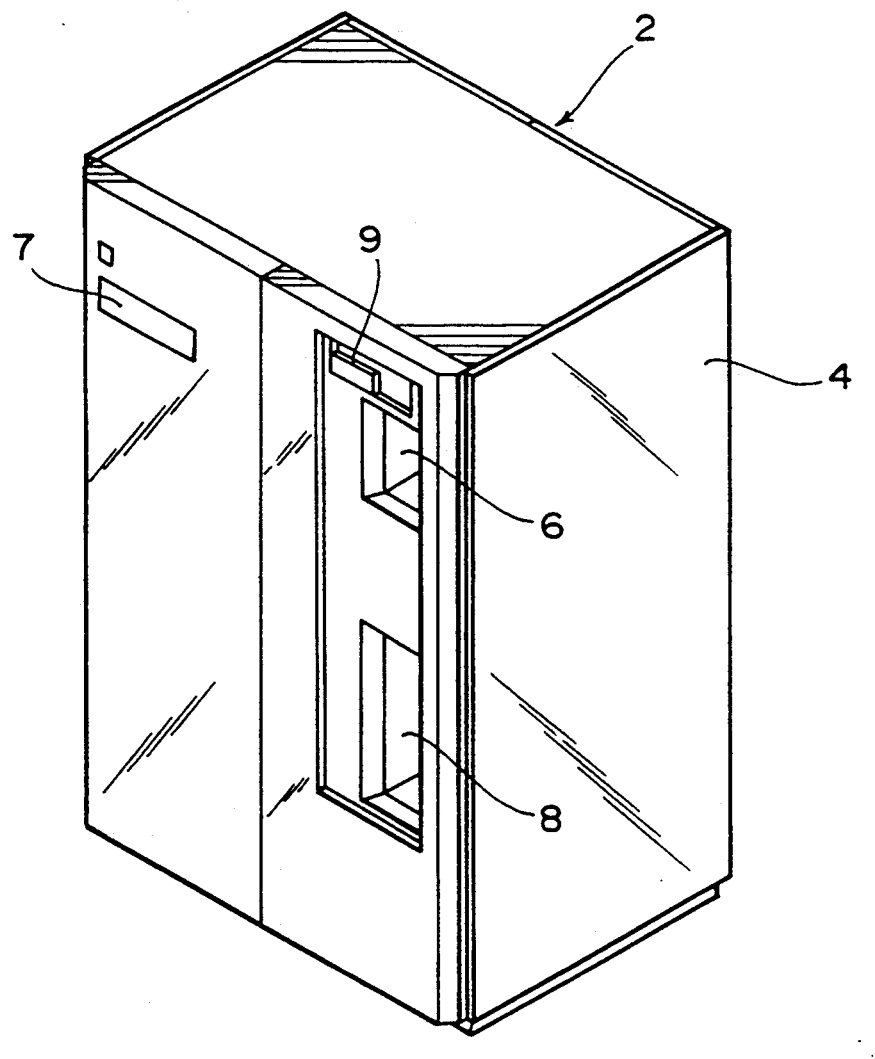
FIG. 1 is a front perspective view of a magnetic tape library apparatus embodying the invention.
Figure 2:
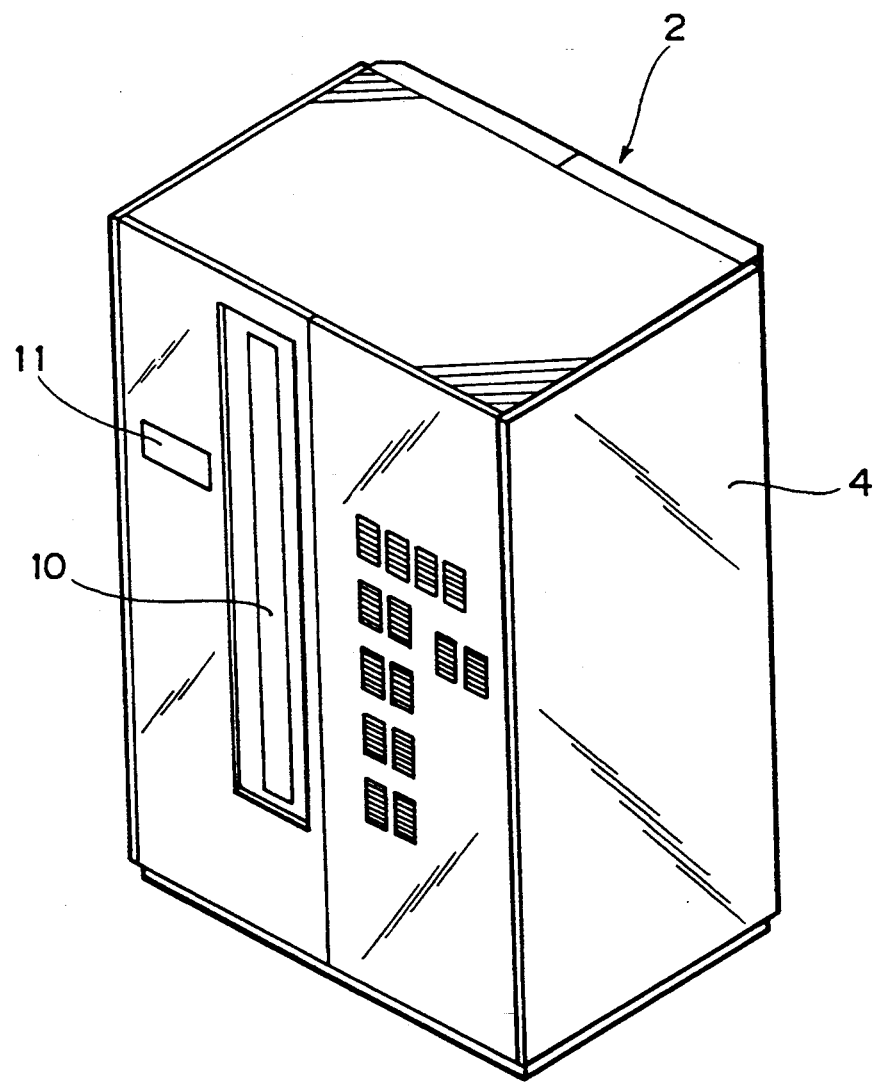
FIG. 2 is a rear perspective view of the embodiment of FIG. 1.

FIG. 1 is a front perspective view of a magnetic tape library apparatus 2 practiced as one preferred embodiment of the invention, and FIG. 2 is a rear perspective view, of the embodiment. A housing 4 of the magnetic tape library apparatus 2 has at its front a cartridge entry opening 6, a cartridge exit opening 8 and a operation panel 7 and 9. The cartridge entry opening 6 is capable of admitting up to, say, 10 magnetic tape cartridges at a time. The cartridge exit opening 8 stacks up to, say, 15 cartridges at a time. At the back of the housing 4 are an operation panel 11 and a mass cartridge entry/ejection mechanism 10 that places a large number of cartridges into a row of cells in a cell drum, to be described later.

Figure 3:
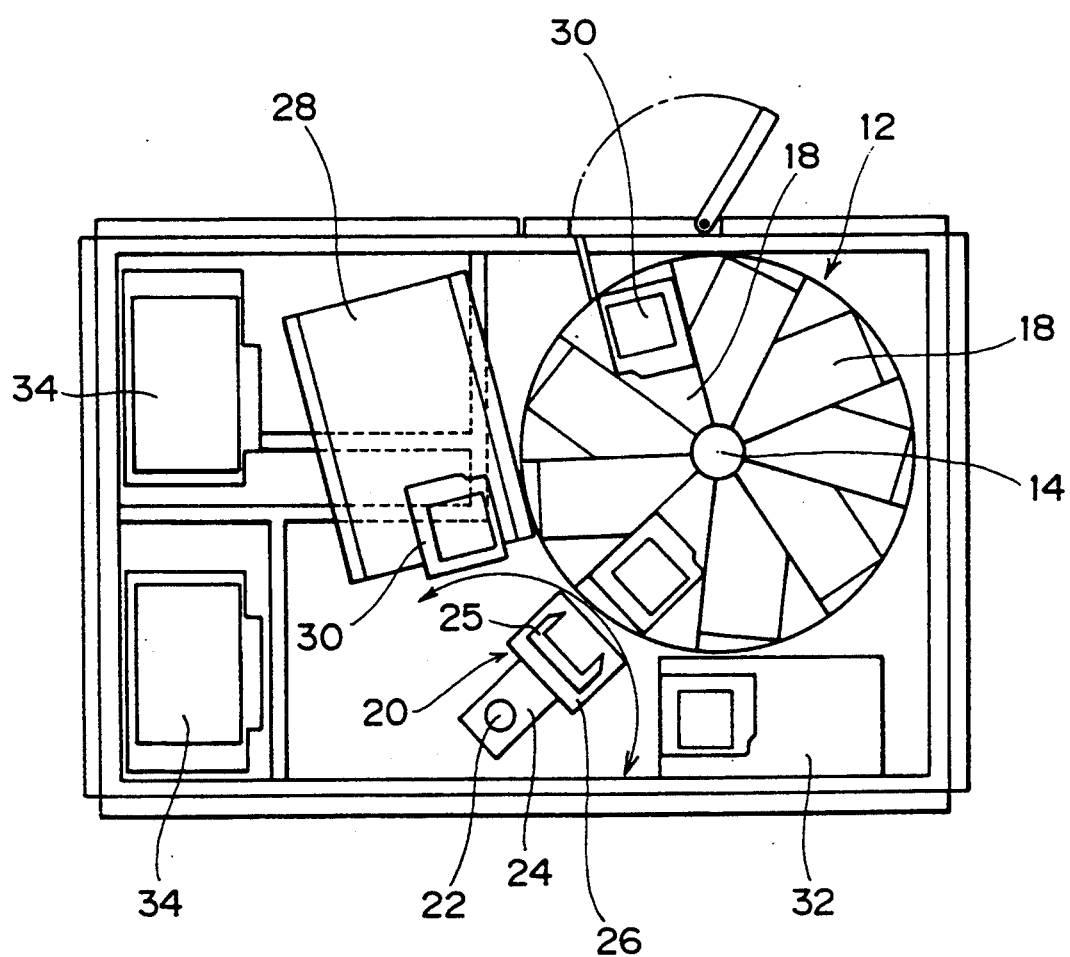
FIG. 3 is a schematic plan view of the embodiment with a top plate of its housing removed.
Figure 4:
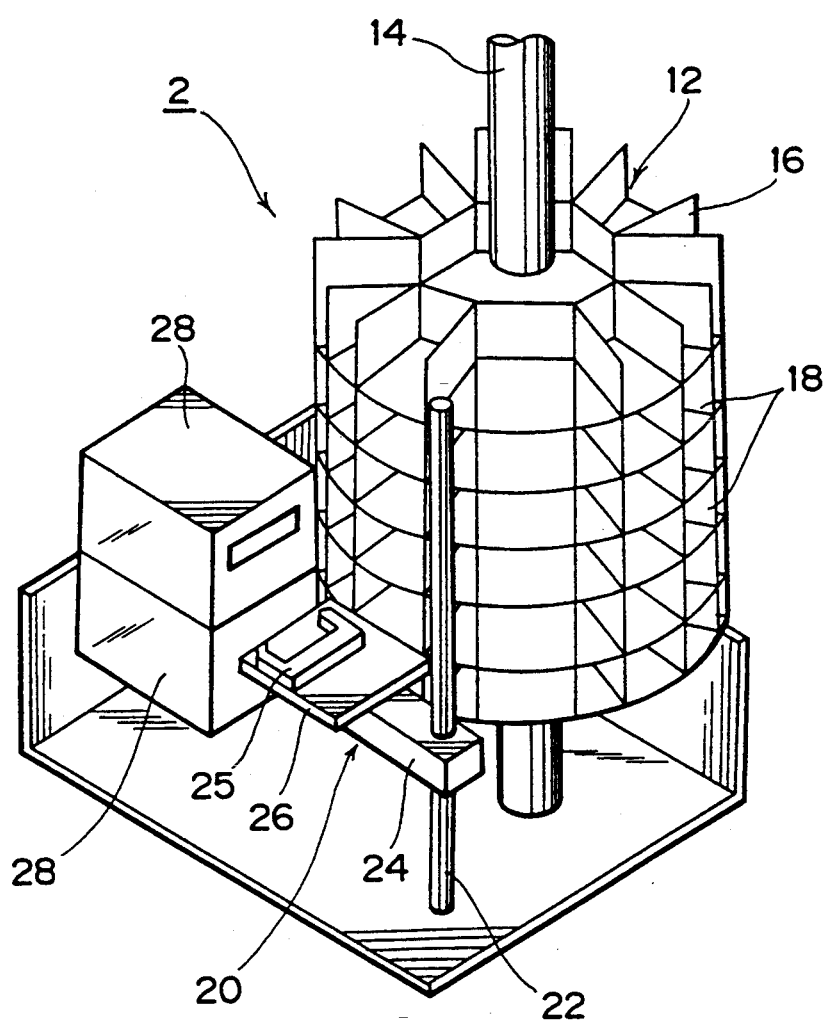
FIG. 4 is a schematic perspective view showing the inside of the embodiment.

In FIGS. 3 and 4, a cell drum 12 is attached to a rotary shaft 14, the drum having a plurality of cells 18 separated by partitions 16. Adjacent to the cell drum 12 are two magnetic tape drive units 28 for writing and reading data to and from magnetic tapes. Between the cell drum 12 and the magnetic tape drive units 28 is an accessor 20 that automatically switches magnetic tape cartridges 30 therebetween; the cartridges 30 are to be loaded into the magnetic tape drive units 28 for read and write Operations. In FIG. 3, reference numeral 32 indicates a cartridge entry/exit unit continued to the cartridge entry opening 6 and the cartridge exit opening 8 of FIG. 1; reference numeral 34 denotes a controllers.

Figure 5:
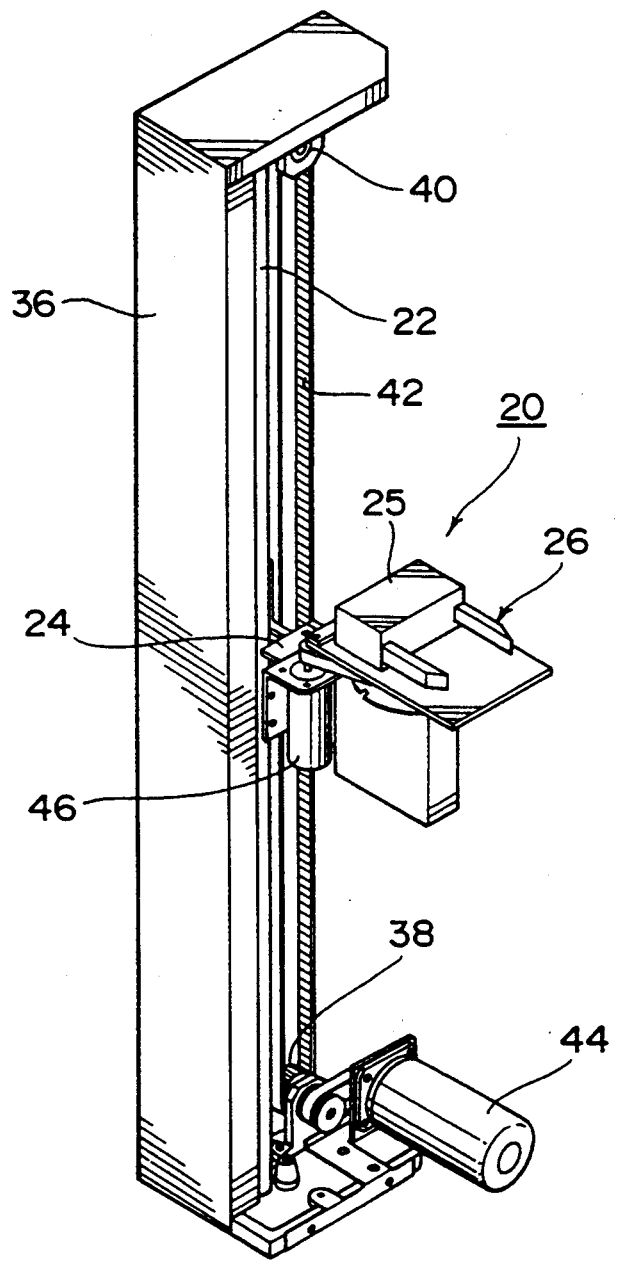
FIG. 5 is a schematic perspective view of an accessor drive mechanism.

The driving mechanism of the accessor 20 is constructed as shown in FIG. 5. A driving pulley 38 and a driven pulley 40 are attached rotatably to an approximately C-shaped support member 36. A timing belt 42 is threaded around the pulleys 38 and 40 in an endless manner. The C-Shaped support member 36 is secured with a guide member 22 extending perpendicularly. Another support member 24 is fixed to the timing belt 42. One end of the support member 24 is engaged with the guide member 22. A hand mechanism 26 with a grip hand 25 is mounted on the support member 24.

When a motor 44 is activated, the support member 24 fixed to the timing belt 42 moves up and down, guided by the guide member 22. That in turn moves vertically the hand mechanism 26 mounted on the support member 24. When a motor 46 is activated, the support member 24 swings horizontally, with the guide member 22 acting as the center of the swing motion. That is, the hand mechanism 26 also swings horizontally. Where the motors 44 and 46 are activated selectively under appropriate control, the hand mechanism 26 is led to gain access to a selected cell 18 in the cell drum 12 as well as to a selected magnetic tape drive unit 28.

The drive mechanism of the accessor 20 is appreciably simplified because it is composed only of the above-described vertical direction driving mechanism and of the swing mechanism centering on the guide member 22. In practice, the cell drum 12, magnetic tape drive units 28 and cartridge entry/exit unit 32 are located around the accessor 20 in such a manner that largely the swing motion of the accessor 20 alone (along with a limited vertical movement) will effect delivery of magnetic tape cartridges among these components.

Figure 6A:
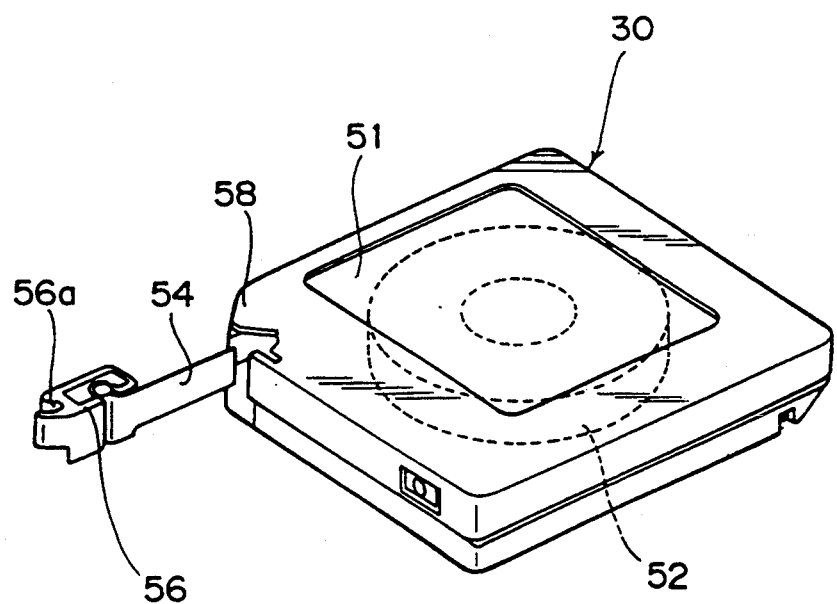
FIG. 6A is an external perspective view of a magnetic tape cartridge.
Figure 6B:
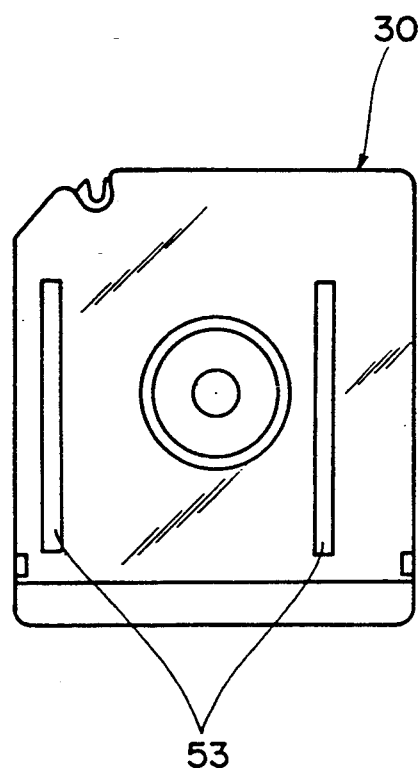
FIG. 6B is a bottom view of the magnetic tape cartridge.

Referring to FIGS. 6A, a tape reel 52 is housed rotatably inside a magnetic tape cartridge 30. The base of a magnetic tape 54 is secured to the tape reel 52, and the intermediate tape portion starting from the base is wound around the reel 52. The tip of the magnetic tape 54 is equipped fixedly with a leader block 56. The leader block 56 has an engagement groove 56a with which a sled pin Of the magnetic tape drive unit 28 is to be engaged. A cutout 58 is formed in one corner of the magnetic tape cartridge 30. As shown in FIG. 6A, the magnetic tape cartridge, 30 has on its top a depression 51 on which a label is pasted. The bottom of the cartridge 30 has a pair of parallel ridges 53, as depicted in FIG. 6B.

Figure 7:
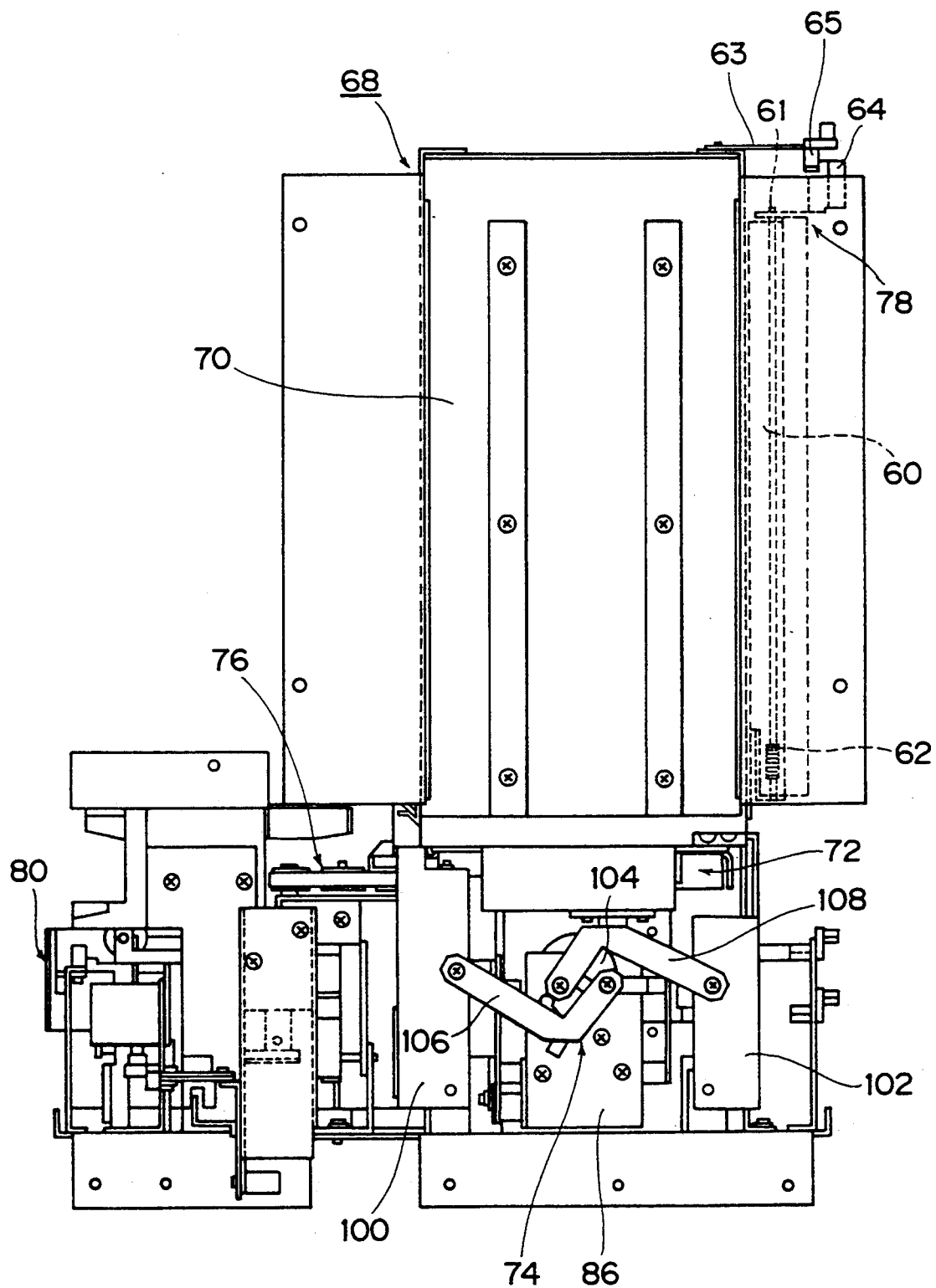
FIG. 7 is a front view of a magnetic tape cartridge entry unit according to an embodiment of the invention.

FIG. 7 is a front view of a cartridge entry unit 68 for entering magnetic tape cartridges into the magnetic tape library apparatus 2. The cartridge entry unit 68 comprises a stacker 70 for stacking a plurality of magnetic tape cartridges, a stage mechanism 72, a hook mechanism 74, a feeder mechanism 76, a gate sensor mechanism 78 and a shutter mechanism 80. The stacker 70 is a box-like part that admits a plurality of magnetic tape cartridges 30 entered by an operator. The stacker 70 is connected to the cartridge entry opening 6 shown in FIG. 1. Cartridges 30 entered into the stacker 70 are stacked thereby onto a stage 82 of the stage mechanism 72. The gate sensor mechanism 78 checks to see if the stacked cartridges 30 are correctly entered.

As will be explained later in more detail, the stage mechanism 72 moves the stage 82 up and down. The hook mechanism 74 separates the lowest-positioned cartridge alone from the remaining multiple cartridges 30 stacked on the stage 82. The feeder mechanism 76 transports to the accessor 20 the single cartridge 30 separated from the cartridge stack by the hook mechanism 74. The shutter mechanism 80 stops temporarily the cartridge fed by the feeder mechanism 76 so as to keep the cartridge from falling off the feeder mechanism 76.

Figure 8:
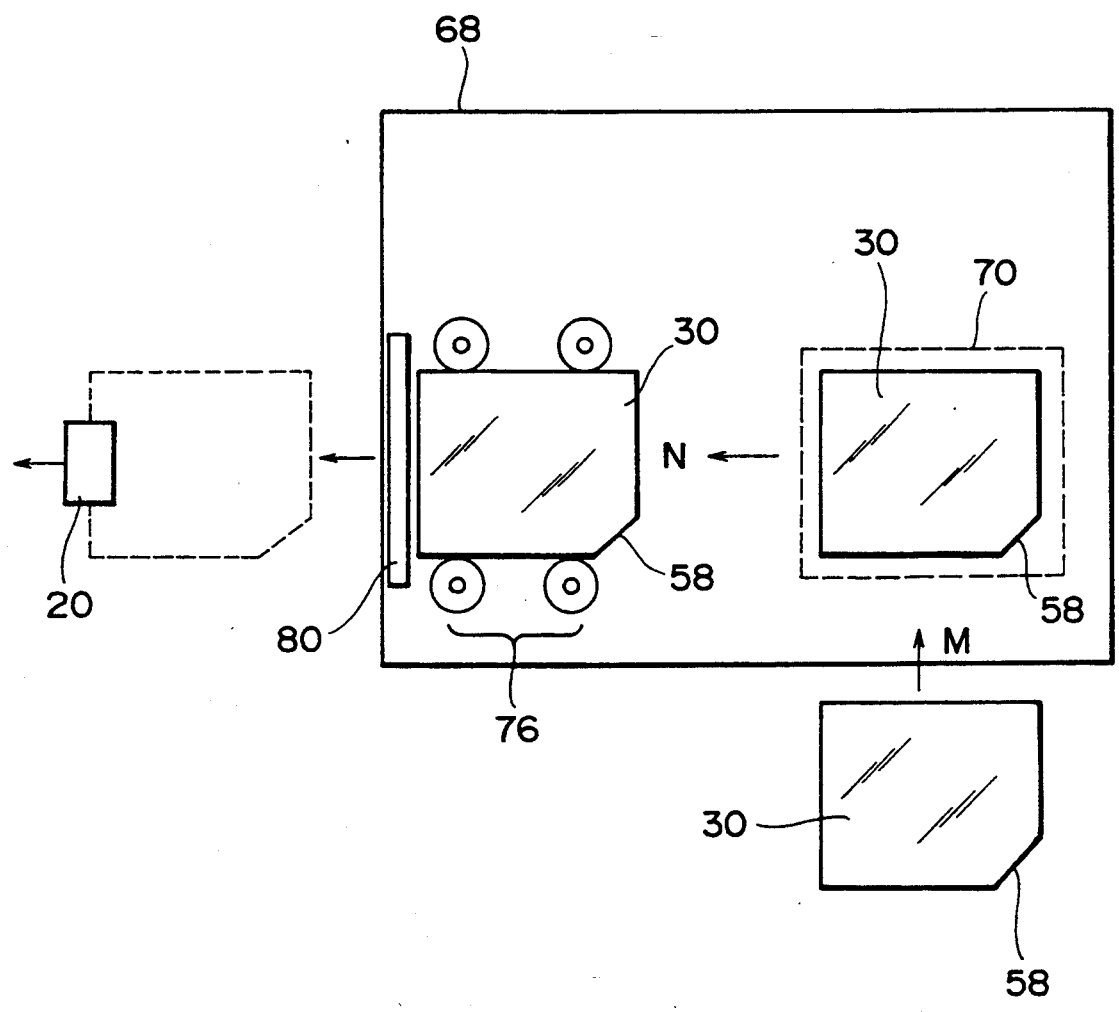
FIG. 8 is a view showing the path through which a cartridge is transported by the magnetic tape cartridge entry unit.

FIG. 8 is a view showing the path through which a cartridge is transported by the magnetic tape cartridge entry unit. The cartridge 30 is entered into the stacker 70 in the arrowed direction M with its cutout 58 facing the front right side. Inside the stacker 70, the lowest-positioned cartridge alone is separated from those thereabove by the stage mechanism 72 and hook mechanism 74, to be described later in more detail. The separated cartridge 30 is transported by the feeder mechanism 76 in the arrowed direction N with the direction of the cartridge at its entry kept unchanged. After getting stopped temporarily by the shutter mechanism 80, the cartridge 30 is delivered to the accessor 20.

Figure 9A:
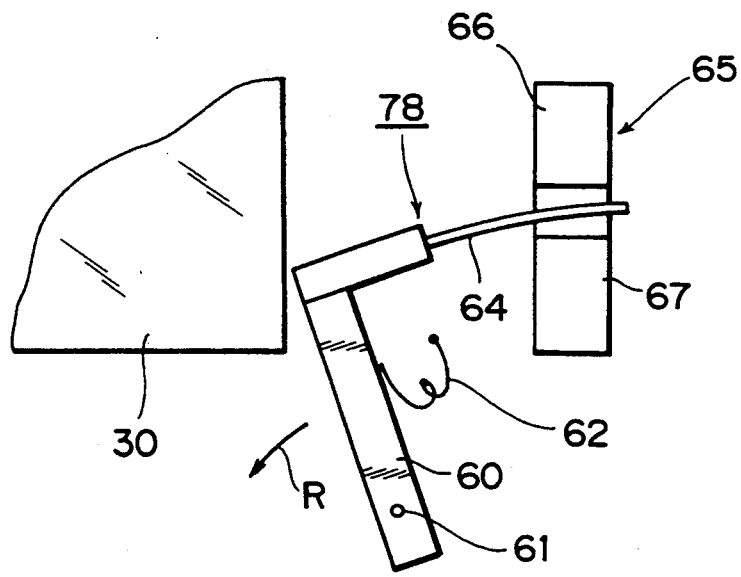
FIGS. 9A and 9B depict how a gate sensor mechanism of the embodiment works, FIG. 9A showing a cartridge being erroneously entered, FIG. 9B depicting a cartridge being normally entered.
Figure 9B:
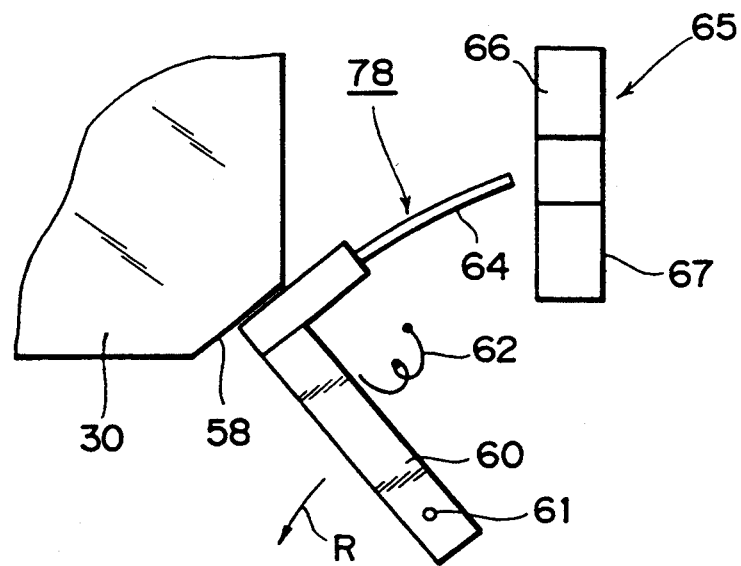

The gate sensor mechanism 78 for detecting a faulty entry of cartridges will now be described with reference to FIGS. 7, 9A and 9B. As shown in FIG. 7, a gate actuator 60 is fed to a shaft 61 which is supported rotatably adjacent to one side of the stacker 70 and which extends in the vertical direction. The gate actuator 60 extends along the entire length of the stacker 70 and is rotatably biased with a spring 62 in the arrowed direction R. The top of the gate actuator 60 is equipped with a flag piece 64. A transmission type photo sensor 65 having a light-emitting diode 66 and a photo-diode 67 is provided in the position into which the flag piece 64 may be inserted.

With no cartridge entered, the gate actuator 60 remains pushed by the spring 62 to rotate sufficiently in the arrowed direction R. In this state, the photo-diode 67 receives light from the light-emitting diode 66 and turns on the photo sensor 65. When the cartridge 30 is entered, the gate actuator 60 is pushed by the cartridge to rotate clockwise.

If the cartridge 30 is not fully entered into the stacker 70 or is entered in an incorrect direction, the gate actuator 60 is pushed by the erroneously entered cartridge to rotate clockwise. This causes the flag piece 64 to be inserted into the photo sensor 65 before the gate actuator 60 stops. In this state, the flag piece 64 shields light from the light-emitting diode 66 and thereby turns off the photo sensor 65. The faulty entry of the cartridge 30 is thus detected.

When the cartridge 30 is entered fully into the stacker 70 in the correct direction, the cutout 58 on the cartridge 30 allows the gate actuator 60, which was rotated clockwise earlier by the push from the cartridge 30, to rotate counterclockwise, i.e., in the arrowed direction R pushed by the spring 62. The action pulls the flag piece 64 out of the photo sensor 65 and thereby turns it off. This allows the normal entry of the cartridge 30 to be detected. At this point, the cartridge 30 is locked to prevent its inadvertent fall from the stacker 70 because the gate actuator 60 interferes with the cutout 58 of the cartridge 30.

How the gate sensor mechanism 78 is illustratively practiced will now be described with reference to FIGS. 7 and 10A through 10C. The photo sensor 65 is attached to a plate member 63 fixed to the top plate constituting part of the stacker 70. The photo sensor as practiced here checks only for a faulty entry of the cartridge 30; whether or not the cartridge 30 is placed on the stage 82 will be detected by a separately provided stage sensor. When the cartridge 30 is stacked on the stage 82, the stage sensor made illustratively of a photo sensor is turned off. This signals the detection of a cartridge entry into the stacker 70. That is, the combination of the gate sensor mechanism 78 with the stage sensor makes it possible to ascertain whether or not a plurality of cartridges have been entered normally into the stacker 70.

Figure 10A:
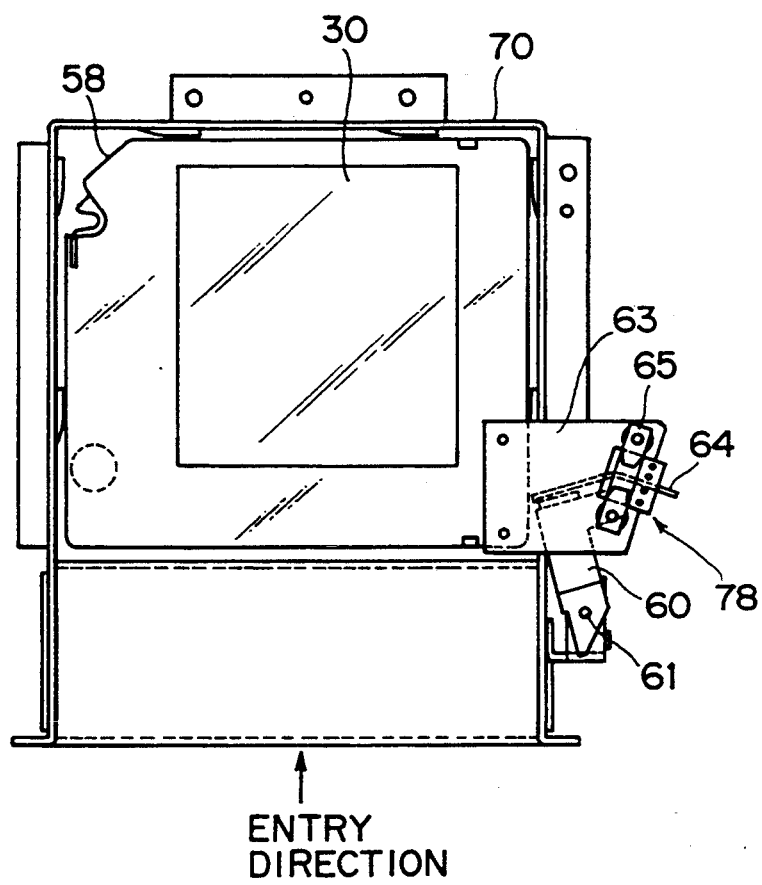
FIGS. 10A through 10C are plan views of the gate sensor mechanism, FIG. 10A showing a cartridge being entered inversely, FIG. 10B depicting a cartridge being incompletely entered, FIG. 10C portraying a cartridge being normally entered.
Figure 10B:
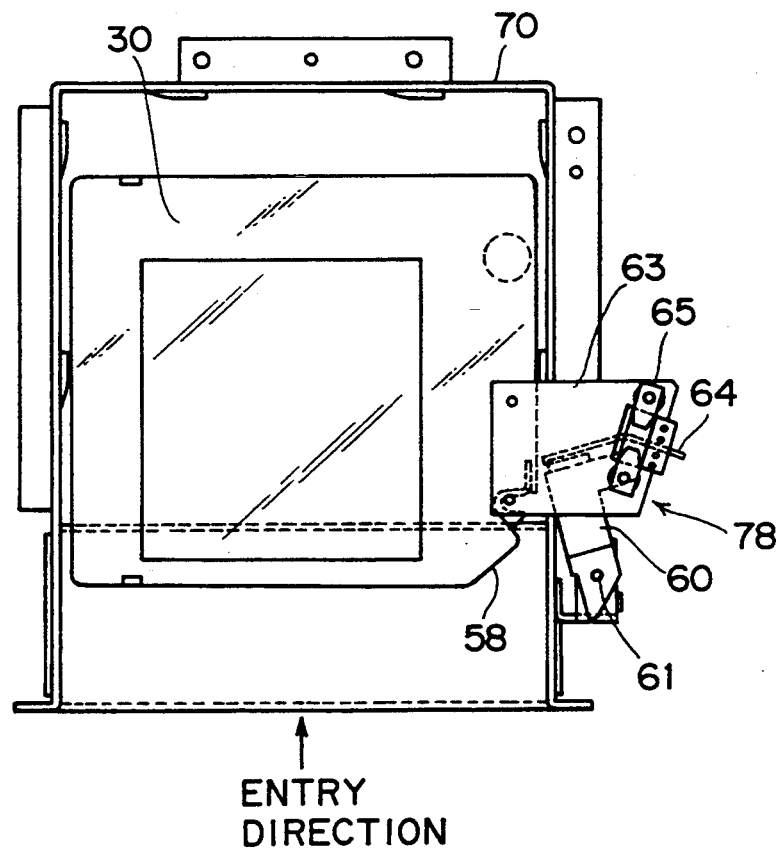

If the cartridge 30 is inserted into the stacker 70 in an incorrect direction, as depicted in FIG. 10A, the gate actuator 60 is pushed by the side wall of the cartridge 30 and fails to return to its home position. This leaves the flag piece 64 inserted in the photo sensor 65. As a result, the photo-diode 67 does not receive light from the light-emitting diode 66 and thus turns off the photo sensor 65. This signals the detection of a faulty entry of the cartridge 30. FIG. 10B shows a case in which the cartridge 30 is entered insufficiently into the stacker 70 in the correct direction; the cartridge 30 has not reached the bottom of the stacker 70. In this case, as with the case of FIG. 10A in which the cartridge was entered in the reverse direction, the gate actuator 60 fails to return to its home position, leaving the flag piece 64 inserted in the photo sensor 65. Consequently, the photo-diode 67 does not receive light from the light-emitting diode 66 and turns off the photo sensor 65. This also signals the detection of a faulty cartridge entry.

Figure 10C:
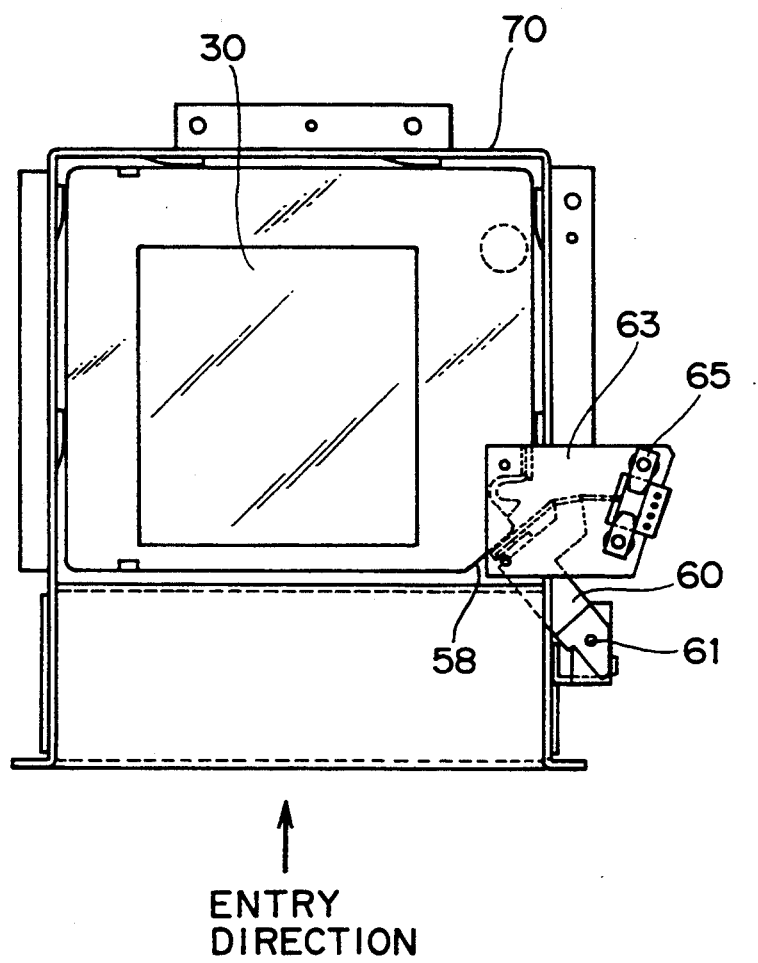

FIG. 10C portrays the cartridge 30 as it is entered correctly into the stacker 70. In this state, the cutout 58 formed in the front right corner of the cartridge 30 allows the gate actuator 60, which was rotated clockwise earlier by the push from the cartridge 30, to return to its home position urged by the spring 62. The tip of the gate actuator 60 comes into contact with the cutout 58. The contact pulls the flag piece 64 out of the photo sensor 65. Extracting the flag piece 64 allows the photo-diode 67 to receive light from the light-emitting diode 66, thereby turning on the photo sensor 65. This signals the detection of a correct entry of the cartridge 30 into the stacker 70. In this state, the tip of the gate actuator 60 is kept in contact with the cutout 58 of the cartridge 30 by the spring 62. Thus the cartridge 30 is locked as entered into the stacker 70. A is described, the gate sensor mechanism 78 of the embodiment is capable of detecting a faulty entry of any one of a plurality of (e.g., 10) cartridges 30 entered at a time.

Figure 11:
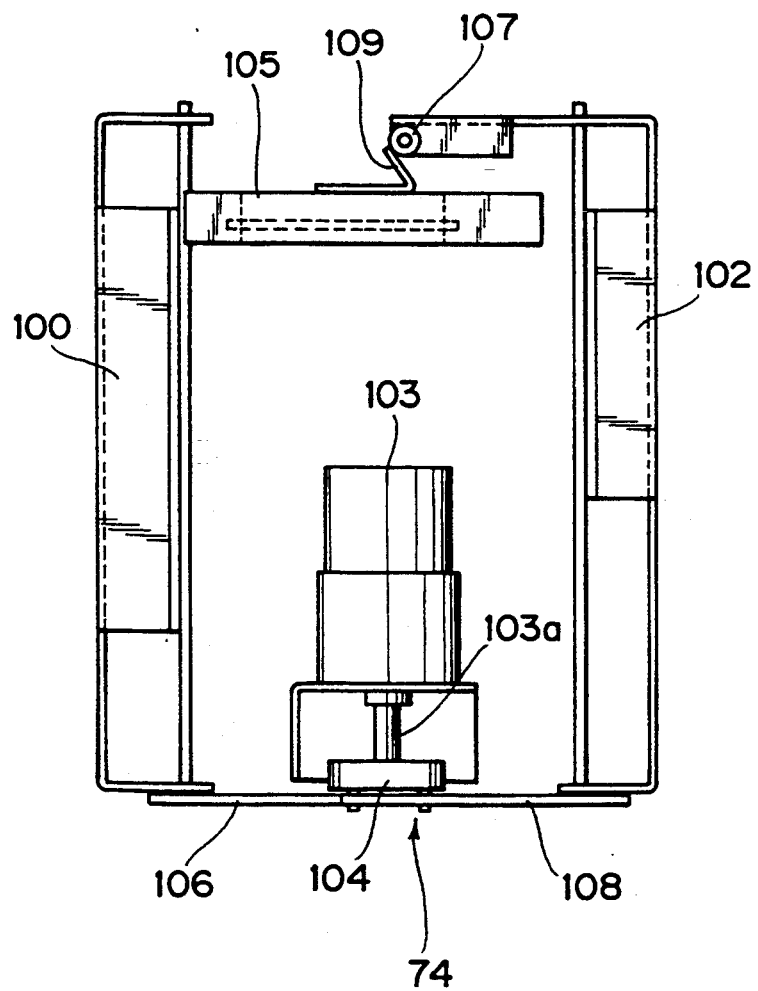
FIG. 11 is a schematic plan view of a hook mechanism according to an embodiment of the invention.

The constitution and operation of the hook mechanism 74 will now be described with reference to FIGS. 11, 12A and 12B. The hook mechanism 74 comprises a front hook 100 and a rear hook 102 pivotably attached to brackets 96 and 98 fixed to an apparatus frame 84. The tips 100a and 102a of the front and rear hooks 100 and 102 are bent as illustrated. As show in FIG. 11, the hook mechanism 74 has a side hook 105 pivotally attached at its lower end to the frame. A bracket 109 fixed to the side hook 105 can come into contact with a roller 107 attached to the rear hook 102. FIG. 11 shows the state in which the hooks 100, 102 and 105 are all closed. The side hook 105 is closed by the push from the rear hook 102.

Figure 12A:
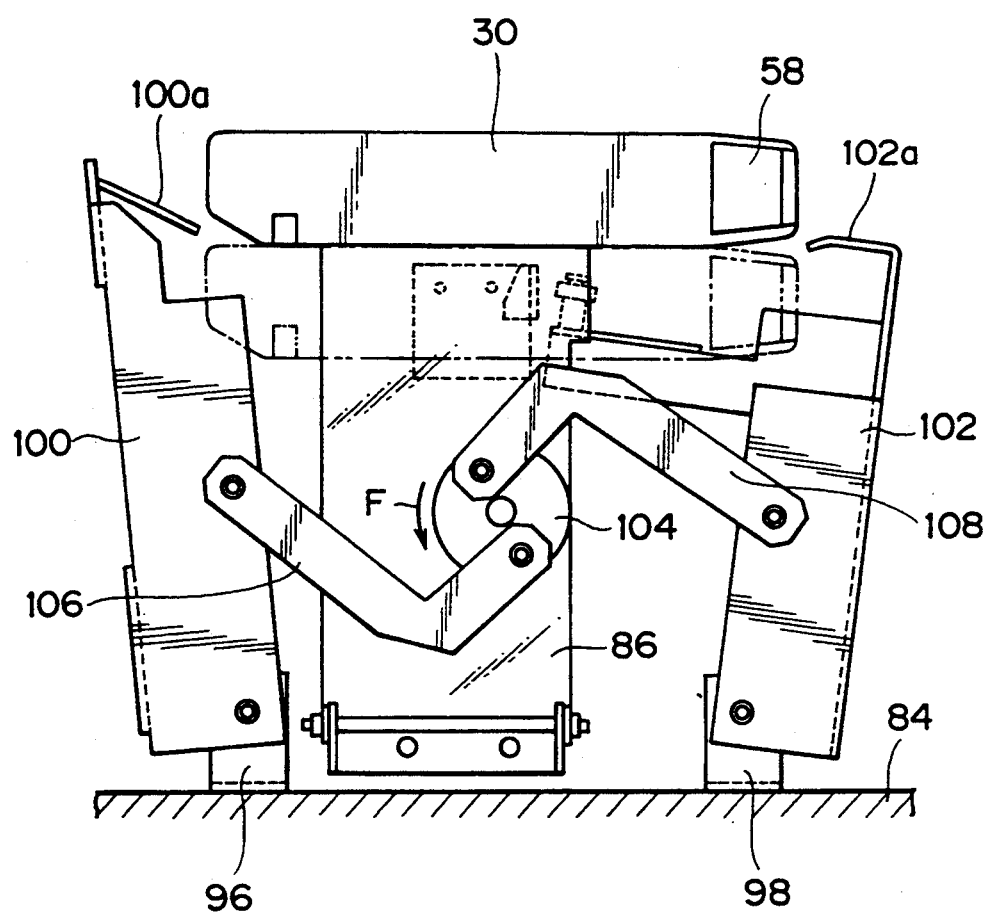
FIGS. 12A and 12B are schematic front views of the hook mechanism in the cartridge entry unit, FIG. 12A showing the hooks being opened, FIG. 12B depicting the hooks being closed.
Figure 12B:
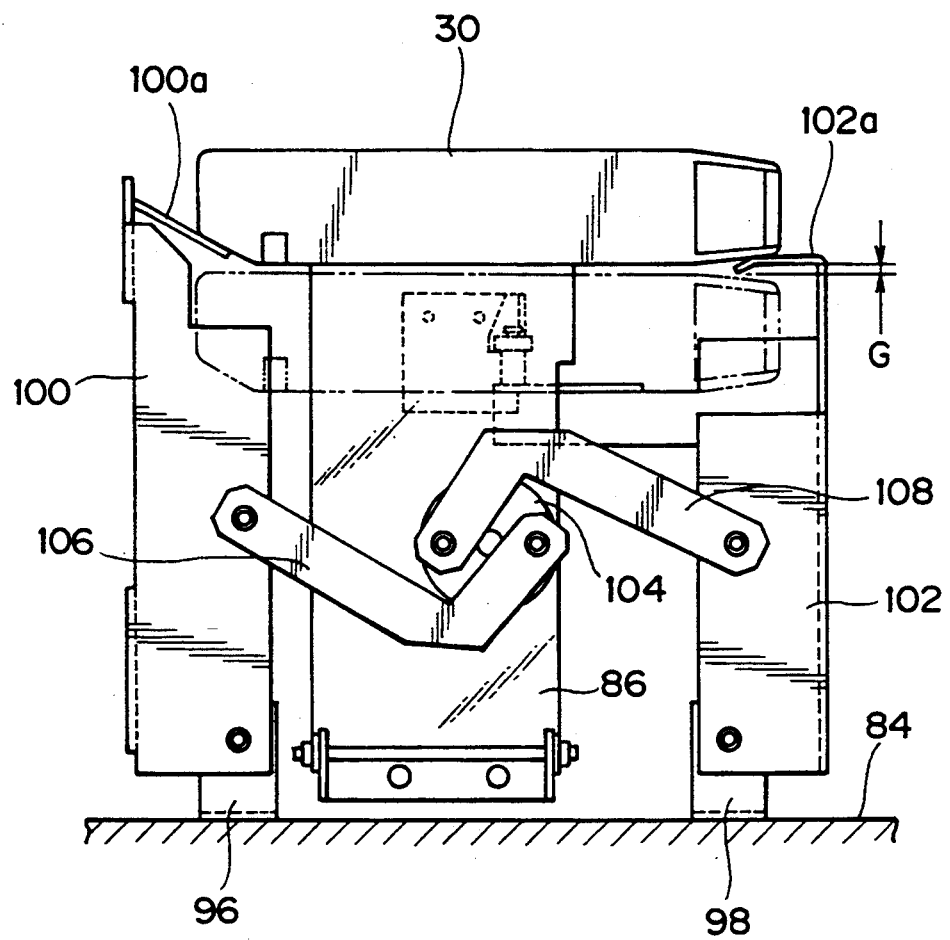

As depicted clearly in FIGS. 12A and 12B, one end of an L-shaped arm 106 is attached rotatably to the front hook 100; one end of an L-shaped arm 108 is also attached rotatably to the rear hook 102. The other ends of the arms 106 and 108 are attached rotatably to eccentrically positioned shafts on a rotor 104. The rotor 104 is fixed to an output shaft 103a of a hook motor 103, as depicted in FIG. 11.

FIG. 12A portrays the front hook 100 and rear hook 102 rotated in a direction in which the tips of the hooks move away from each other. With the roller 107 leaving the bracket 109, the side hook 105 also moves to an opened position. In this state, the hook motor 103 is activated to rotate the rotor 104 in the arrowed direction F of FIG. 12A. The rotation of the rotor 104 turns the front hook 100 and rear hook 102 via the arms 106 and 108 so that the tips of the hooks move closer to each other. As shown in FIG. 12B, the tips 100a and 102a of the front, hook 100 and rear hook 102 are inserted between the lowest-positioned cartridge 30 and the next-lowest cartridge 30. The stacked cartridges above the lowest-positioned cartridge 30 are raised therefrom by the hooks by about 2 mm. In this manner, the lowest cartridge 30 is separated from the remaining cartridges.

The operation of the hook mechanism 74 and the constitution and operation of the stage mechanism 72 will now be described in detail with reference to Figs. 13A and 13B. A bracket 86 fixed to the apparatus frame 84 supports a shaft 90 rotatably. A gear 88, fixed to the shaft 90, engages with a gear 87 coupled to a stage motor, not shown. A stage cam 92 is fixed eccentrically to the shaft 90. A cam follower 94 that follows the stage cam 92 is attached rotatably to the stage 82.

Figure 13A:
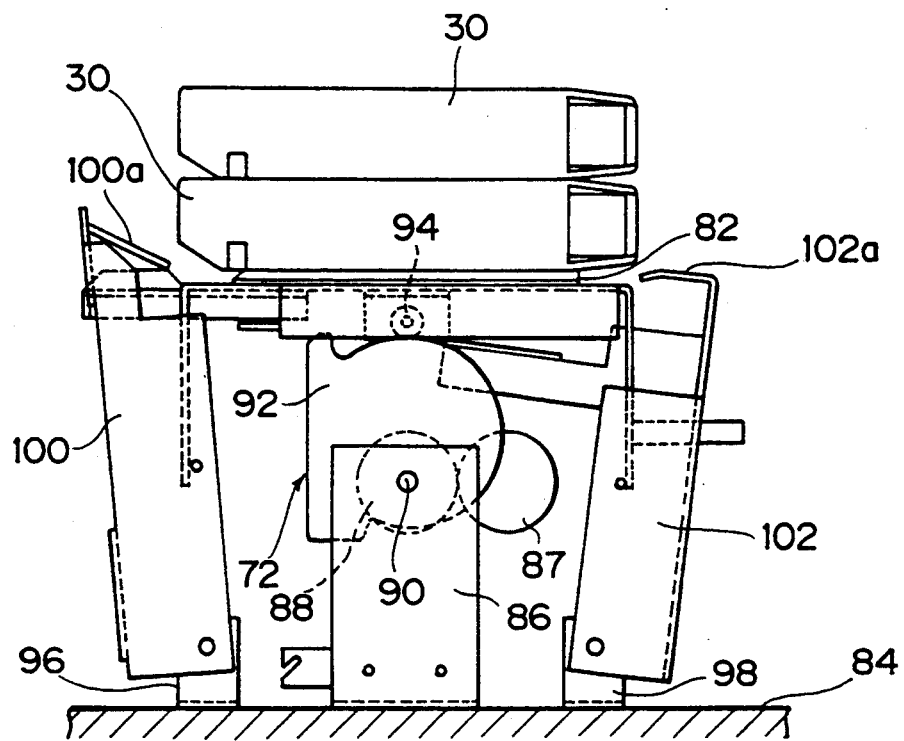
FIGS. 13A and 13B are schematic front views of the stage and hook mechanisms in the cartridge entry unit, FIG. 13A showing the stage at its highest position, FIG. 13B depicting the stage at its lowest position, with the lowest-positioned cartridge being separated from the other cartridges.
Figure 13B:
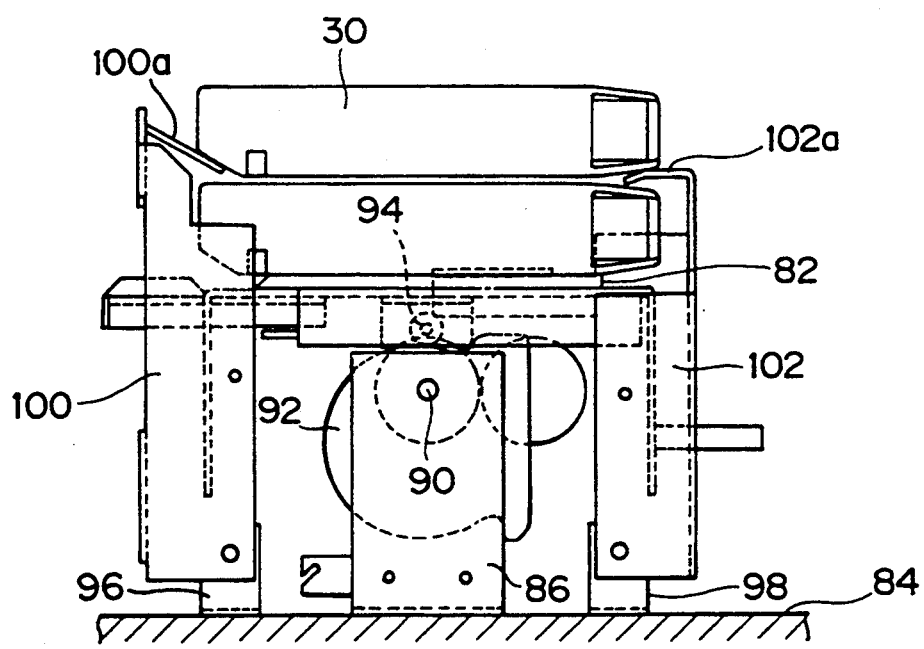

FIG. 13A shows the stage 82 at its highest position. The front hook 100, rear hook 102 and side hook 105 are all opened. These hooks are thus positioned away from the cartridges 30 placed on the stage 82. In this state, the stage 82 is pushed to its highest position by the stage cam 92. Activating the stage motor in this state causes the stage cam 92 to rotate counterclockwise via the gears 87 and 88, whereby the stage 82 starts coming down. The cartridges 30 placed on the stage 82 are also lowered along with the stage. With the stage 82 lowered to its lowest position, the hook motor 103 is activated to rotate the rotor 104 counterclockwise, as depicted in FIG. 12A. This in turn rotates the front hook 100 and rear hook 102 so that their tips 100a and 102a move closer to each other. As shown in FIG. 13B, the tips 100a and 102a of the front hook 100 and rear hook 102 are inserted between the lowest-positioned cartridge and the second-lowest cartridge stacked on the stage 82. Then the second-lowest and higher cartridges are lifted by about 2 mm, as described, whereby the lowest cartridge is separated from the remaining cartridges. The gap G of about 2 mm is needed by the feeder mechanism 76 to transport the separated cartridge 30, as will be described later. If a sufficient gap G is not obtained, the lowest-positioned cartridge 30, after separation from the other cartridges, will interfere with the cartridge immediately above when transported by the feeder mechanism 76.

The lowest cartridge 30 thus separated is gripped, with its orientation unchanged, by the feeder mechanism 76. The feeder mechanism 76 transports the cartridge 30 to the appropriate position for delivery to the accessor 20. The constitution and operation of the feeder mechanism 76 Will now be described with reference to FIGS. 14A and 14B. L-shaped catch arms 114 and 116 are pivotably attached with pins 115 and 117 to brackets 110 and 112, respectively. One end of the catch arm 114 is coupled rotatably with a pin 118 to one end of the catch arm 116. A plurality of feed rollers 120 are attached rotatably to the top of the catch arm 114; a plurality of feed rollers 122 are also attached rotatably to the top of the catch arm 116. An endless belt 130 is threaded around the feed rollers 122. The catch arm 116 is equipped with a feed motor 124. Activating the feed motor 124 rotates one of the feed rollers 122 via gears 126 and 128.

An actuator member 132 is coupled to the catch arm 116. The tip of the actuator member 132 has two engagement grooves 132a and 132b. The bottom of a support member 134 has an engagement groove 134a. The two ends of a coil spring 136 are engaged with the engagement grooves 132a and 134a. A self-holding type feeder solenoid 138 is attached to the support member 134. A coil spring 14 is disposed between a plunger 139 of the feeder solenoid 138 and the engagement groove 132b of the actuator member 132.

When the solenoid 138 is not magnetized, the actuator member 132 is pulled downward by the coil spring 136. This causes the two catch arms 114 and 116 to rotate away from each other. As shown in FIG. 14A, the roller 120 and feed belt 130 are not in contact with the side of the cartridge 30. In this state, momentarily magnetizing the self-holding type solenoid 138 causes the plunger 139 to spread the coil spring 140 and to raise the actuator member 132 against the force of the coil spring 136. That in turn rotates the two catch arms 114 and 116 toward each other. As depicted in FIG. 14B, the feed roller 120 and feed belt 130 come in elastic contact with the sides of the cartridge 30. In this state, activating the feed motor 124 rotates the feed belt 130 to transport the cartridge 30 to the appropriate position for delivery to the accessor 20.

While the cartridge 30 is being transported to the appropriate position for delivery to the accessor 20, an excessively driven feed motor 124 can cause the cartridge to fall off the feeder mechanism 76. Such fall is prevented by the shutter mechanism 80 that positions the cartridge 30 so as to ensure delivery to the accessor 20. The constitution and operation of the shutter mechanism 80 will now be described with reference to FIGS. 15A and 15B. A shutter 144 is pivotably attached with a shaft 146 to a bracket 142. A bracket 148 is equipped with a solenoid 150. The shutter 144 is rotatably coupled to the solenoid 150 with a pin 152. FIG. 15A depicts the shutter 144 as it is lowered after the solenoid 150 is demagnetized. FIG. 15B shows the shutter 144 rotated counterclockwise by a magnetized solenoid 150 to block the transport path of the feeder mechanism 76.

The solenoid 150 is magnetized at approximately the same time that the feed motor 124 is activated. The magnetized solenoid 150 turns the shutter 144 counterclockwise to block the transport path of the cartridge 30. Halfway through the transport path of the feeder mechanism 76 is a sensor, not shown, which detects passage of the cartridge 30. A predetermined time (e.g., 0.5 sec.) after passage of the cartridge 30 is detected by the sensor, the feed motor 124 is deactivated. During that time, the cartridge 30 collides with the shutter 144, slips for a while and stops there. Thereafter, the solenoid 150 is demagnetized, and the shutter 144 is rotated back to its lowered position that does not block the transport path of the cartridge 30, is shown in FIG. 15A.

Until the accessor 20 comes to fetch the cartridge 30, the feeder mechanism 76 keeps the cartridge 30 gripped. The cartridge 30 is held gripped as follows. First, the self-holding type solenoid 138 is momentarily magnetized. This raises the plunger 139 and keeps it there. Then the feed roller 120 and endless belt 130 laterally grip the cartridge in elastic fashion. When the accessor 20 has gripped the cartridge 30, the self-holding type solenoid 138 is supplied with a current that flows in the direction opposite to that used when the plunger 139 is attracted. The flow of the current releases the plunger 139 from its attracted position. With the cartridge 30 thus disengaged from the feeder mechanism 76, the accessor 20 grips the cartridge 30 and brings it to the appropriate cell of the cell drum 12.

Figure 16:
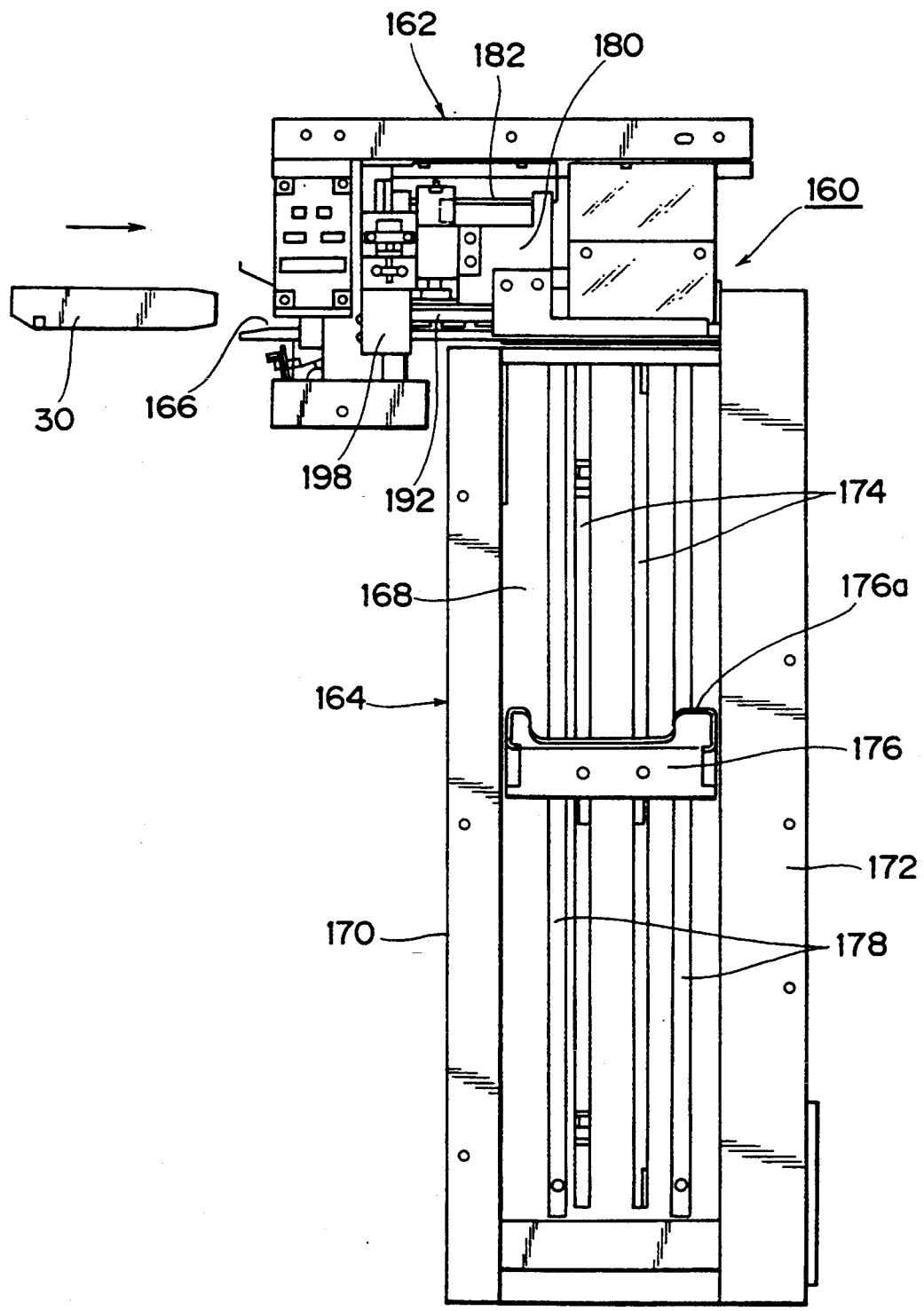
FIG. 16 is a front view of an automatic cartridge ejection unit according to an embodiment of the invention.

How an embodiment of the automatic magnetic tape cartridge ejection unit is practiced will now be described with reference to FIGS. 16 through 21. The automatic magnetic tape cartridge ejection unit 160 is connected to the cartridge exit opening 8 shown in FIG. 1. FIG. 16 is a front view of the automatic cartridge ejection unit 160 in its entirety. The automatic cartridge ejection unit 160 comprises a cartridge transport mechanism 162 and a tray assembly 164 disposed under the cartridge transport mechanism 162. The cartridge transport mechanism 162 receives the magnetic tape cartridge 30 delivered by the accessor 20, transports the cartridge 30 to an appropriate position and releases it there. The magnetic tape cartridge 30 is inserted into the cartridge transport mechanism 162 through an insertion opening 166.

The tray assembly 164 includes a rear wall 168 and a pair of side walls 170 and 172. A tray 176 on which to receive the magnetic tape cartridge 30 is connected to a tray driving mechanism 205, to be described later, via a pair of longitudinal slits 174 formed on the rear wall 168. The magnetic tape cartridge 30 is placed on a cartridge-carrying surface 176a of the tray 176. The rear wall 168 has a pair of projected guides 178 that extend longitudinally.

Figure 17:
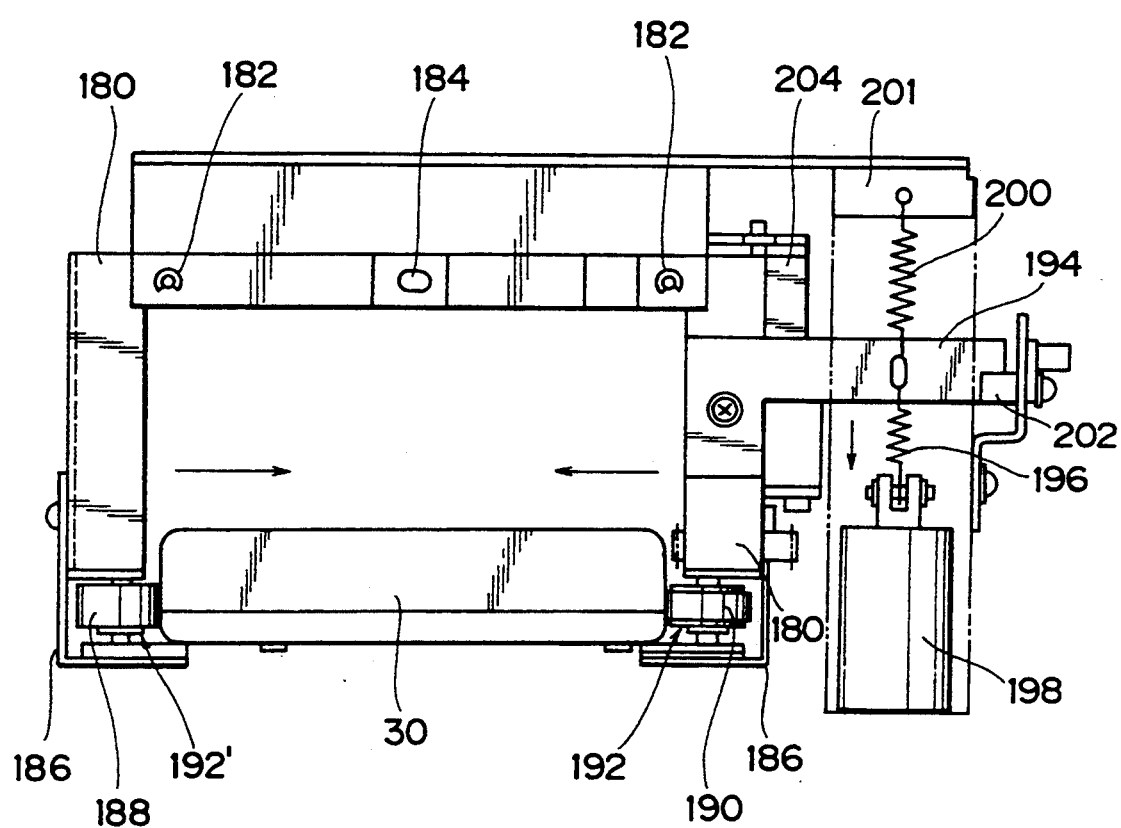
FIG. 17 is a side view of a cartridge transport mechanism of the embodiment as it grips a cartridge.

The constitution and operation of the cartridge transport mechanism 162 will now be described with reference to FIGS. 17 and 18. A pair of L-shaped catch arms 180 are rotatably attached to shafts 182 that are disposed horizontally. One end of one catch arm 180 is rotatably coupled to one end of the other catch arm 180 with a pin 184. The other ends of the two catch arms 180 are each equipped with a guide bracket 186 that extends horizontally. The guide brackets 186 are in turn provided with feed mechanisms 192 and 192' which feed the magnetic tape cartridge 30. The right-hand side feed mechanism 192 comprises a plurality of feed rollers 188 and an endless belt 190 threaded around these rollers 188. The left-hand side feed mechanism 192 includes only a plurality of feed rollers 188 attached rotatably to the guide bracket 186.

One catch arm 180 is coupled to an actuator member 194. The actuator member 194 is connected to one end of a push spring 196 as well as to one end of a release spring 200, as illustrated. The other end of the push spring 196 is coupled to a self-holding type solenoid 198 that drives the catch arms 180. The other end of the release spring 200 is fixed to a frame 201 of the cartridge transport mechanism 162. Magnetizing the solenoid 198 rotates the two catch arms 180 around the horizontal shafts 182 toward each other. This causes the feed mechanisms 192 and 192' at the tips of the catch arms 182 to be pressed against the sides of the magnetic tape cartridge 30, as depicted in FIG. 17.

When the solenoid 198 is demagnetized, the release spring 200 pulls up the actuator member 194, rotating the catch arms 180 around the horizontal shafts 182 away from each other. This causes the feed mechanisms 192 and 192' to release the magnetic tape cartridge 30. Adjacent to the actuator member 194 is a sensor 202 that detects the motion of the catch arms 180. An output signal from the sensor 202 permits detection of the opened or closed state of the catch arms 180. A feed motor 204 is provided to drive the feed mechanism 192.

Figure 18:
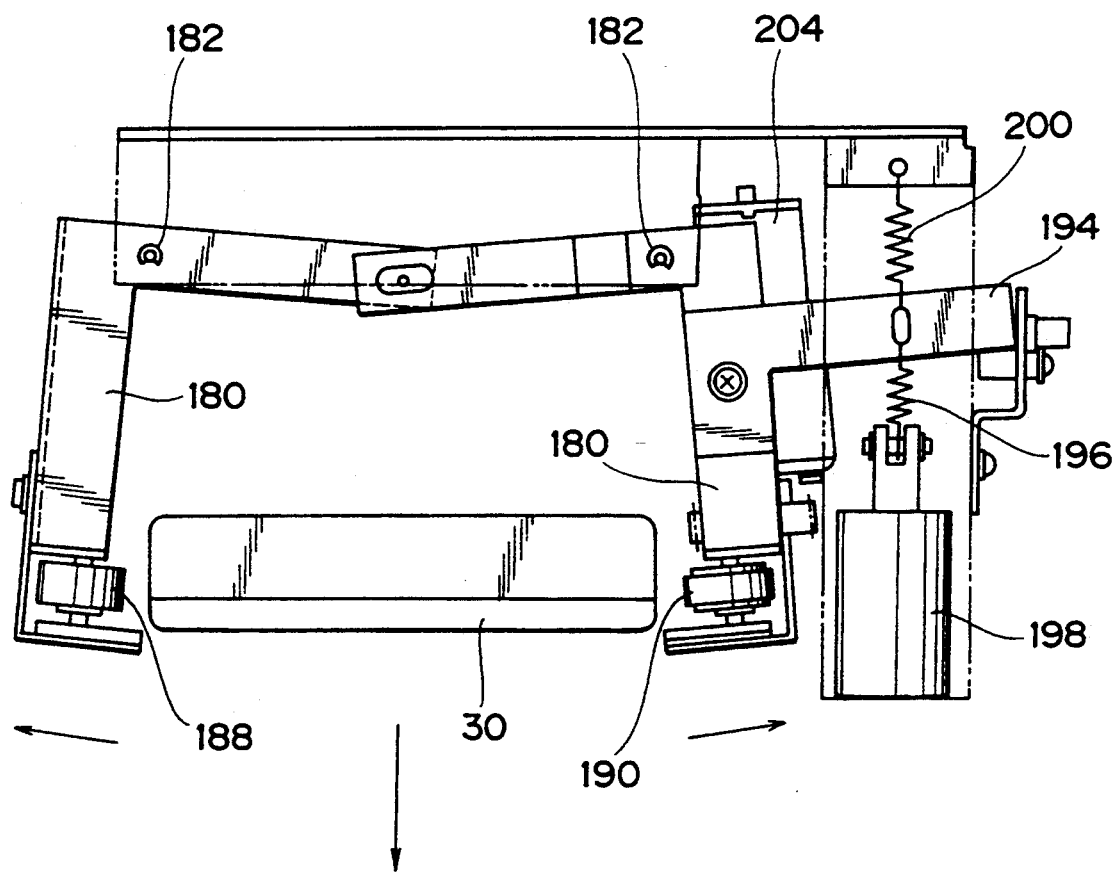
FIG. 18 is a side view of the cartridge transport mechanism as it releases a cartridge.

With the magnetic tape cartridge 30 inserted in the insertion opening 166, the solenoid 198 is demagnetized, and the two catch arms 180 are rotated away from each other, as illustrated in FIG. 18. When the magnetic tape cartridge 30 is inserted between the two feed mechanisms 192 and 192' through the insertion opening 166, the solenoid 198 is magnetized. This rotates the catch arm 180 toward each other, causing the feed mechanisms 192 and 192' at the tips of the arms 180 to grip the sides of the magnetic tape cartridge 30 and keep it in an approximately horizontal state.

Then activating the feed motor 204 causes the feed mechanisms 192 and 192' to transport the magnetic tape cartridge 30 to the right until the exit position above the tray assembly 164 is reached, as shown in FIG. 16. With the exit position attained, the feed mechanism 192 is deactivated and the solenoid 198 is demagnetized. This allows the release spring 200 to force the catch arms 180 into rotation away from each other, as depicted in FIG.

18. The magnetic tape cartridge 30 then falls downward and into the tray assembly 164.

Figure 19:
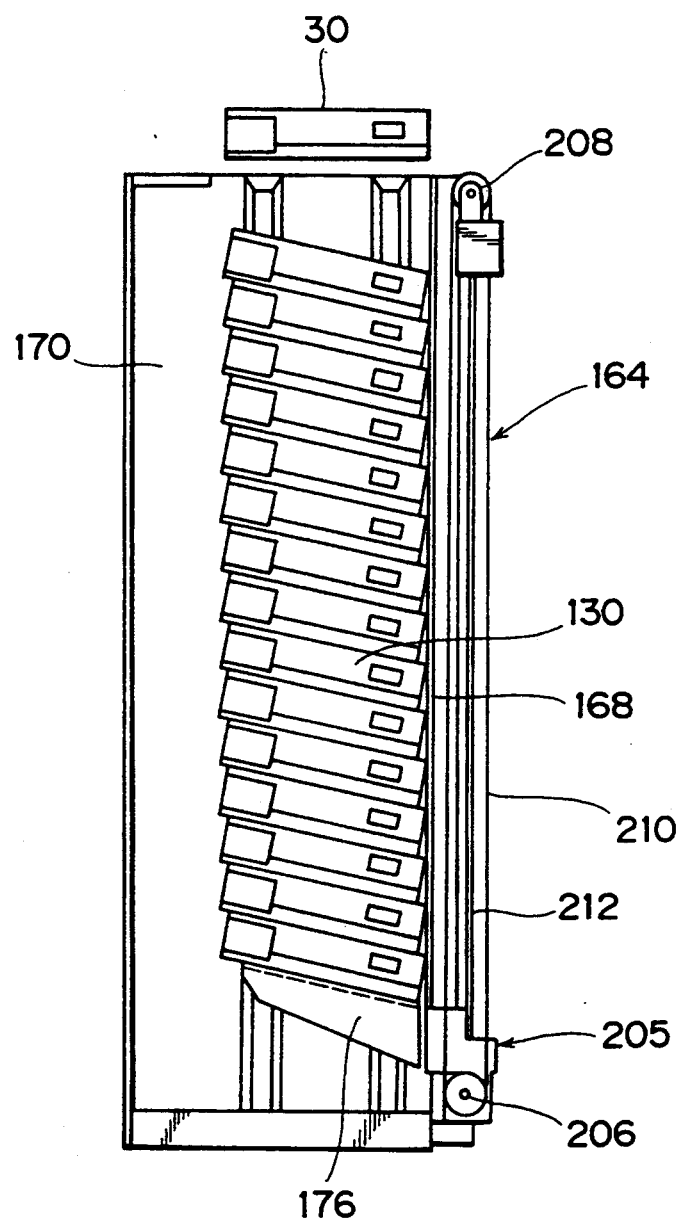
FIG. 19 is a longitudinal sectional view of a tray assembly in the automatic cartridge ejection unit.

FIG. 19 is a longitudinal sectional view of the tray assembly 164. As illustrated, a frame 212 is furnished integrally on the rear wall 168. The bottom and the top of the frame 212 have a driving pulley 206 and a driven pulley 208, respectively, both rotatably disposed. An endless belt 210 is threaded around the driving pulley 206 and driven pulley 208. The tray 176 is fixed to the endless belt 210 with a bracket. When the endless belt 210 is rotated by the driving mechanism 205, the tray 176 moves up and down along the rear wall 168.

Figure 20:
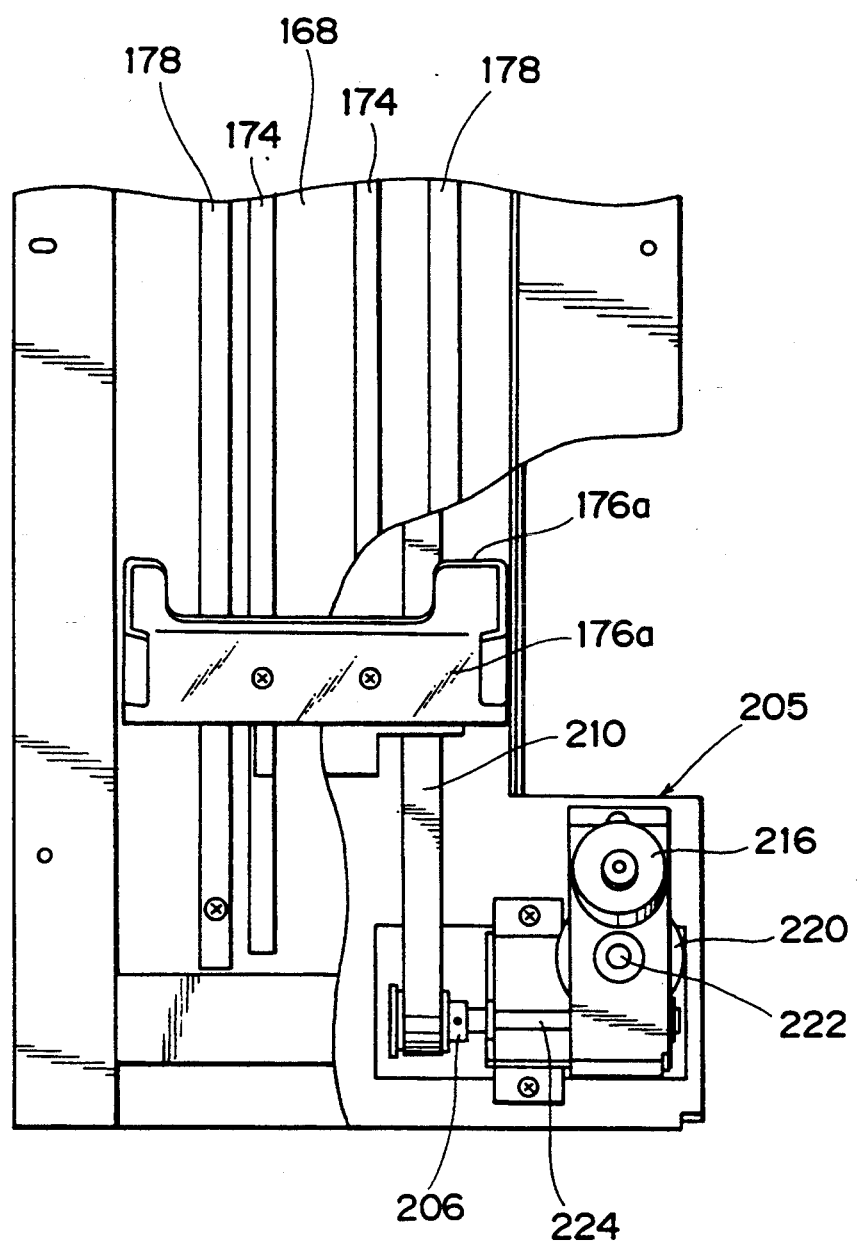
FIG. 20 is a partially broken front view of a tray driving mechanism.
Figure 21:
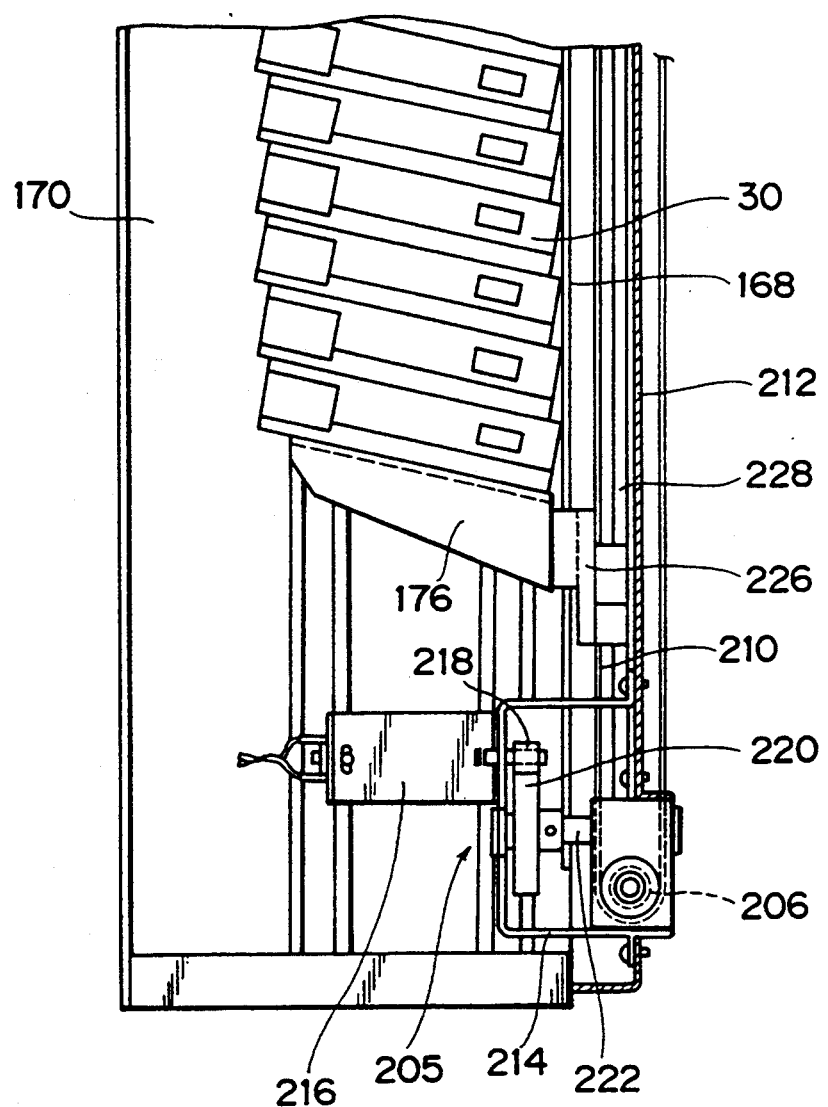
FIG. 21 is a partially broken longitudinal sectional view of the tray assembly disposed in connection with the tray driving mechanism.

Referring now to FIGS. 20 and 21, the tray driving mechanism 205 includes a motor 216 attached to a bracket 214 fixed to the frame 212. A gear 218, fixed to the output shaft of the motor 126, engages with a gear 220 fixed to a shaft 222. A worm gear, not shown, is attached fixedly to the shaft 222. The worm gear engages with a worm wheel fixed to a shaft 224. Activating the motor 216 to rotate the shaft 222 turns the driving pulley 206 attached to one end of the shaft 224, whereby the endless belt 210 is rotated.

As shown in FIG. 21, the tray 176 is fixed to the endless belt 210 using a bracket 226. Driving the motor 216 moves the bracket 226 fixed to the tray 176 in a vertically sliding manner along a guide 228. The tray 176 has on its top the cartridge-carrying surface 176a. The tray 176 is attached slidingly to the rear wall, with the front end of the tray-carrying surface 176a disposed higher than the rear end thereof.

The tray 176 is initially in its raised position so as to receive the cartridge 30 released by the cartridge transport mechanism 162. The height of the cartridges 30 stacked on the tray 176 is detected by a sensor, not shown, So that the tray 176 is lowered gradually and correspondingly. Up to about 15 cartridges 30 are to be stacked on the tray 176. Because the tray 176 is attached slidingly to the rear wall with the front end of its cartridge-carrying surface 176a elevated, the cartridges 30 placed on the tray 176 will not fall forward.

Figure 22:
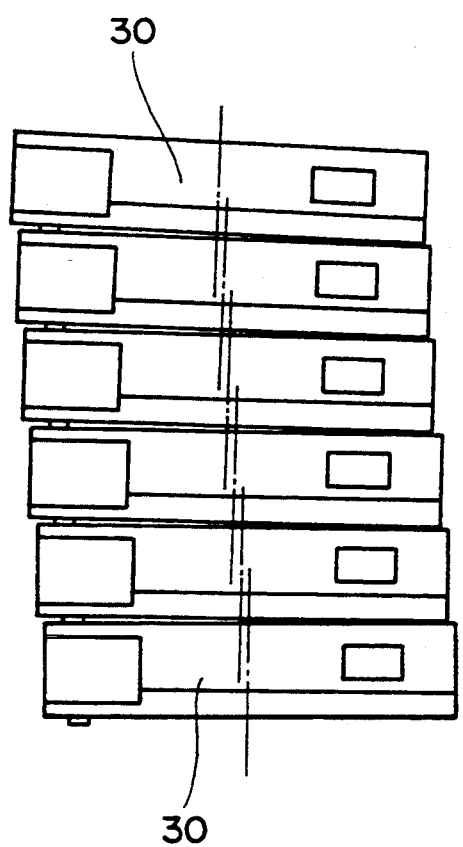
FIG. 22 is an enlarged schematic view of cartridges as they are stacked on the tray assembly of FIG. 19.

When cartridges 30 are stacked, the ridges 53 at the bottom of each cartridge engage with the depression 51 of the cartridge immediately below, whereby the cartridges are supposed to be stacked in a stable manner. In the tray assembly of FIG. 19, however, the rear wall 168 furnished perpendicularly prevents the ridges 53 from engaging snugly with the depressions 51. As shown in the exaggerated example of FIG. 22, the higher the cartridges 30 are stacked, the more unstable the stack becomes. An attempt to extract a plurality of stacked cartridges 30 as a whole from the tray assembly 164 can make the stack become unstable and even topple.

Figure 23:
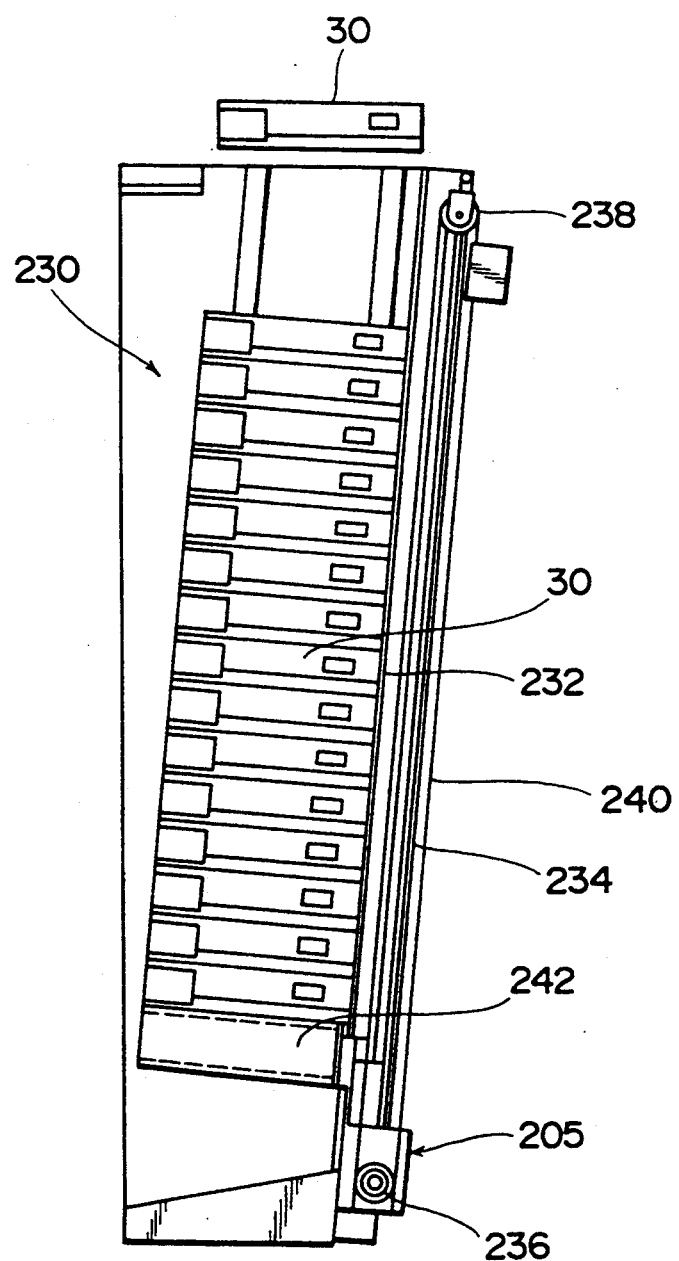
FIG. 23 is a longitudinal sectional view of another tray assembly according to the invention.

This problem is resolved by another tray assembly according to the invention. Referring to FIG. 23, this tray assembly 230 has the upper part of its rear wall 232 tilted slightly backward with respect to the perpendicular direction. The tilt angle is preferably between 5 and 10 degrees. A driving pulley 236 is attached rotatably to the bottom of a frame 234 provided integrally on the rear wall. The top of the frame 234 has a driven pulley 238 attached rotatably thereto. An endless belt 240 is threaded around the driving pulley 236 and driven pulley 238. A tray 242 is fixed to the endless belt 240 via a bracket. A tray driving mechanism 205 is the same in structure and function as the tray driving mechanism 205 described earlier and will not,be discussed here again.

In the tray assembly 230 of the above-described constitution, each magnetic tape cartridge 30 that fell from the cartridge transport mechanism 162 has its ridges 53 engaged snugly with the depression 51 of the cartridge immediately below. As shown in FIG. 23, a plurality of cartridge 30 are thus stacked on the tray 242 in an orderly and stable manner. Because the stack is so stable, there is little possibility of the cartridges 30 accidentally toppling when they are taken as a whole out of the tray assembly 230. Thus the tray assembly 230 permits much easier and more convenient handling of the cartridges 30.

Although the description above contains many specificities, these should not be construed as limiting the scope of the invention but as merely providing illustrations of the presently preferred embodiment of this invention. For example, the above-described magnetic tape library apparatus embodying the invention is not limitative thereof; the invention may also be applied to library apparatuses handling cartridges of other recording media.

Thus the scope of the invention should be determined by the appended claims and their legal equivalents, rather than by the examples given.

What is claimed is:

1. A library apparatus comprising:
   a cell unit having a plurality of cells each accommodating a recording medium cartridge;
   a recording medium drive unit for writing and reading data to and from any one of said recording medium cartridges;
   an accessor for automatically switching recording medium cartridges between said cell unit and said recording medium drive unit; and
   a cartridge entry unit for entering recording medium cartridges into said library appartus, said cartridge entry unit including:
   a stacker for stacking a plurality of recording medium cartridge so tht each cartridge rests on any cartridge below it, and the lowest cartridge rests on stage means for carrying the recording medium cartridge stacked in said stacker, said stage means being arranged to move up and down;
   hook means for separating the lowest-positioned cartridge from the recording medium cartridges stacked directly on said lowest-positioned cartridge by separating the stacked cartridges and lifting them off of said lowest-positioned cartridge; and
   delivery means for delivery to said accessor the recording medium cartridge separated by said hook means, said delivery means gripping the separated recording medium cartridge at multiple locations, said delivery means being arranged to execute the delivery without altering the orientation of the separated recording medium cartridge in effect when the carriage was stacked in said stacker.

2. A library apparatus according to claim 1, further comprising:
   shutter means disposed between said delivery means and said accessor for delaying delivery until the accessor is in position to accept a cartridge, said shutter means including:
   a frame;
   a shutter plate attached rotatably to said frame at a position where said delivery means delivers the recording medium cartridge to said accessor; and
   a solenoid for driving said shutter plate.

3. A library apparatus according to claim 1, further comprising faulty cartridge entry detection means within said cartridge entry unit including:
- a gate actuator provided rotatably and positioned adjacent to one side of said stacker and extending in parallel therewith;
- a flag piece attached to said gate actuator; said flag piece moving in response to faulty entry of a cartridge into said cartridge entry unit;
- and a sensor for detecting movement of said flag piece.

4. A library apparatus according to claim 3, wherein each of said recording medium cartridges has a cutout in one corner thereof and said faulty cartridge entry detection means includes biasing means for biasing said gate actuator toward protrusion into said stacker, said gate actuator coming into contact with said cutout of any recording medium cartridge entered correctly into said stacker so that the cartridge will be prevented from getting dislodged inadvertently.

5. A library apparatus according to claim 1, wherein said stage means comprises:
- a stage for carrying recording medium cartridges;
- a stage cam fixed eccentrically to a rotation shaft;
- driving means for driving said rotation shaft; and a cam follower attached rotatably to said stage for following said stage cam.

6. A library apparatus according to claim 1, wherein said hook means comprises:
- a frame;
- a pair of hooks pivotably mounted to said frame at the bottom of said hook means, each hook having a bent tip; and
- driving means for rotating the tips of said hooks selectively toward and away from each other.

7. A library apparatus according to claim 6, wherein said driving means comprises:
- a disc mounted for rotation to said frame;
- a first arm having one end pivotably mounted to one of said pair of hooks and the other end pivotably mounted in an eccentric manner to said disc;
- a second arm having one end pivotably mounted to the other hook and the other end in an eccentric manner to said disc; and
- a motor for rotating said disc.

8. A library apparatus according to claim 1, wherein said delivery means comprises:
- a frame;
- a first and a second L-shaped catch arm of which intermediate positions are pivotably mounted to said frame;
- means for pivotably coupling one end of the first catch arm to one end of the second catch arm;
- a plurality of rollers attached rotatably to the other end of said first catch arm and to that of said second catch arm;
- a motor for driving the rollers attached to at least one of the two catch arms; and
- driving means for moving the other end of said first catch arm and that of said second catch arm selectively toward and away from each other.

9. A library apparatus according to claim 8, wherein said driving means comprises:
- an actuator member connected to one of said first and said second catch arms;
- a first spring for biasing said actuator member so as to rotate the other end of said first catch arm and that of said Second catch arm away from each other;
- a solenoid for biasing said actuator member so as to rotate the other end of said first catch arm and that of said second catch arm toward each other; and
- a second spring interposed between said actuator member and said solenoid.

10. A library apparatus comprising:
- a cell unit having a plurality of cells each accommodating a recording medium cartridge;
- a recording medium drive unit for writing and reading data to and from any one of said recording medium cartridges;
- an accessor for automatically switching recording medium cartridges between said cell unit and said recording medium drive unit;
- a cartridge entry unit for entering recording medium cartridges into said library apparatus, said cartridge entry unit including: a stacker for stacking a plurality of recording medium cartridges so that each cartridge rests on any cartridge below it, and the lowest cartridge rests on stage means for carrying the recording medium cartridges stacked in said stacker, said stage means being arranged to move up and down; hook means for separating the lowest-positioned cartridge from the recording medium cartridges stacked directly on said lowest-positioned cartridge by separating the stacked cartridges and lifting them off of said lowest-positioned cartridge; and delivery means for delivering to said accessor the recording medium cartridge separated by said hook means, said delivery means gripping the recording medium cartridge separated by said hook means at multiple locations, said delivery means being arranged to execute the delivery without altering the orientation of the separated recording medium cartridge in effect when the cartridge was stacked in said stacker; and
- an automatic cartridge ejection unit for automatically ejecting recording medium cartridges from inside said library apparatus, said automatic cartridge ejection unit including: cartridge transport means for receiving the recording medium cartridge delivered by said accessor, transporting the delivered cartridge to a predetermined position and releasing the cartridge therein; and a tray assembly disposed under said cartridge transport means for carrying the recording medium cartridge released by said cartridge transport means, said tray assembly comprising a pair of side walls, a rear wall, a tray furnished in a vertically movable manner along said rear wall, and driving means for moving said tray vertically.

* * * * *

UNITED STATES PATENT AND TRADEMARK OFFICE
CERTIFICATE OF CORRECTION

Page 1 of 3

PATENT NO. : 5,432,656
DATED : July 11, 1995
INVENTOR(S) : Motoyama et al.

It is certified that error appears in the above-indentified patent and that said Letters Patent is hereby corrected as shown below:

Column 1, line 16, delete "System" and insert --system--.

Column 2, line 1, delete ""by,its"," and insert --by its--.

Column 2, line 33, delete "i" and insert --it--.

Column 4, line 44, delete "Operations" and insert --operations--.

Column 4, line 53, delete "C-Shaped" and insert --C-shaped--.

Column 5, line 20, delete "Of" and insert --of--.

Column 5, line 68, delete "fed" and insert --fixed--.

Column 7, line 20, delete "A is" and insert --As--.

Column 7, line 56, delete "front,hook" and insert --front hook--.

UNITED STATES PATENT AND TRADEMARK OFFICE
CERTIFICATE OF CORRECTION

PATENT NO. : 5,432,656
DATED : July 11, 1995
INVENTOR(S) : Motoyama et al.

It is certified that error appears in the above-indentified patent and that said Letters Patent is hereby corrected as shown below:

Column 8, line 36, delete "Will" and insert --will--.

Column 8, line 56, delete "14" and insert --140--.

Column 9, line 36, delete "is" and insert --as--.

Column 10, line 57, delete "arm" and insert --arms--.

Column 11, line 35, delete "So" and insert --so--.

Column 11, line 67, delete "not,be" and insert --not be--.

Column 12, line 6, delete "cartridge" and insert --cartridges--.

UNITED STATES PATENT AND TRADEMARK OFFICE
CERTIFICATE OF CORRECTION

PATENT NO. : 5,432,656
DATED : July 11, 1995
INVENTOR(S) : Motoyama et al.

It is certified that error appears in the above-indentified patent and that said Letters Patent is hereby corrected as shown below:

Column 12, line 39, delete "tht" and insert --that--.

Column 12, line 42, delete "cartridge" and insert --cartridges--.

Column 14, line 10, delete "Second" and insert --second--.

Signed and Sealed this

Twenty-fourth Day of October, 1995

*Attest:*

BRUCE LEHMAN

*Attesting Officer*     *Commissioner of Patents and Trademarks*